(12) United States Patent
Takagi et al.

(10) Patent No.: US 10,196,727 B2
(45) Date of Patent: Feb. 5, 2019

(54) HIGH STRENGTH GALVANIZED STEEL SHEET HAVING EXCELLENT BENDABILITY AND WELDABILITY, AND METHOD OF MANUFACTURING THE SAME

(71) Applicant: JFE Steel Corporation, Tokyo (JP)

(72) Inventors: Shusaku Takagi, Tokyo (JP); Kohei Hasegawa, Tokyo (JP)

(73) Assignee: JFE Steel Corporation (JP)

( * ) Notice: Subject to any disclaimer, the term of this patent is extended or adjusted under 35 U.S.C. 154(b) by 209 days.

(21) Appl. No.: 14/870,322

(22) Filed: Sep. 30, 2015

(65) Prior Publication Data

US 2016/0017473 A1 Jan. 21, 2016

Related U.S. Application Data

(62) Division of application No. 13/698,301, filed as application No. PCT/JP2011/002999 on May 30, 2011, now abandoned.

(30) Foreign Application Priority Data

| May 31, 2010 | (JP) | 2010-125306 |
| May 26, 2011 | (JP) | 2011-118173 |

(51) Int. Cl.

| C23C 2/02 | (2006.01) |
| C21D 8/02 | (2006.01) |
| C21D 8/04 | (2006.01) |
| C21D 9/46 | (2006.01) |
| C22C 38/00 | (2006.01) |
| C22C 38/02 | (2006.01) |
| C22C 38/06 | (2006.01) |
| C22C 38/22 | (2006.01) |
| C22C 38/26 | (2006.01) |
| C22C 38/28 | (2006.01) |
| C22C 38/32 | (2006.01) |
| C22C 38/38 | (2006.01) |
| C23C 2/06 | (2006.01) |
| B32B 15/04 | (2006.01) |
| B32B 15/18 | (2006.01) |
| C21D 8/00 | (2006.01) |
| C23C 2/26 | (2006.01) |
| C23C 2/28 | (2006.01) |
| C23C 2/40 | (2006.01) |
| B32B 15/01 | (2006.01) |
| C21D 6/00 | (2006.01) |
| C22C 38/04 | (2006.01) |
| C22C 38/12 | (2006.01) |
| C22C 38/14 | (2006.01) |

(52) U.S. Cl.
CPC .............. *C23C 2/02* (2013.01); *B32B 15/013* (2013.01); *B32B 15/043* (2013.01); *B32B 15/18* (2013.01); *C21D 6/002* (2013.01); *C21D 6/005* (2013.01); *C21D 6/008* (2013.01); *C21D 8/005* (2013.01); *C21D 8/0226* (2013.01); *C21D 8/0247* (2013.01); *C21D 8/0473* (2013.01); *C21D 9/46* (2013.01); *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/26* (2013.01); *C22C 38/28* (2013.01); *C22C 38/32* (2013.01); *C22C 38/38* (2013.01); *C23C 2/06* (2013.01); *C23C 2/26* (2013.01); *C23C 2/28* (2013.01); *C23C 2/40* (2013.01); *C21D 8/0236* (2013.01); *C21D 8/0278* (2013.01); *C21D 2211/002* (2013.01); *C21D 2211/004* (2013.01); *C21D 2211/005* (2013.01); *C21D 2211/008* (2013.01); *Y10T 428/12799* (2015.01)

(58) Field of Classification Search
CPC . B32B 15/18; C21D 2211/002; C21D 8/0226; C23C 2/06; Y10T 428/12799
USPC .......................................................... 148/534
See application file for complete search history.

(56) References Cited

U.S. PATENT DOCUMENTS 8,076,008 B2 * 12/2011 Kaneko ................. C22C 38/001
428/659
8,389,128 B2 3/2013 Takagi et al.

FOREIGN PATENT DOCUMENTS

| CN | 101657558 A | 2/2010 |
| EP | 2 426 230 | 3/2012 |
| JP | 55-091943 A | 7/1980 |

(Continued)

OTHER PUBLICATIONS

Machine Translation of JP 10-130782 A, May 19, 1998.
(Continued)

*Primary Examiner* — Jie Yang
(74) *Attorney, Agent, or Firm* — DLA Piper LLP (US)

(57) ABSTRACT

A method of manufacturing a galvanized steel sheet includes a two-stage temperature raising process which includes: primary heating the sheet from 200° C. to an intermediate temperature of 500 to 800° C. at a primary average heating rate of 5 to 50° C./second at an excess air ratio of 1.10 to 1.20 maintained up to the intermediate temperature; secondary heating the sheet from the intermediate temperature to an annealing temperature of 730 to 900° C. at a secondary average heating rate of 0.1 to 10° C./second at an excess air ratio of less than 1.10 maintained up to the annealing temperature; holding the sheet to the annealing temperature for 10 to 500 seconds; cooling the sheet to 450 to 550° C. at an average cooling rate of 1 to 30° C./second; and subjecting the sheet to a galvanizing process and, optionally, an alloying process.

4 Claims, No Drawings

(56) References Cited

FOREIGN PATENT DOCUMENTS

| | | |
|---|---|---|
| JP | 2-175839 A | 7/1990 |
| JP | 5-195149 A | 8/1993 |
| JP | 10-130782 A | 5/1998 |
| JP | 2001-011538 A | 1/2001 |
| JP | 3263143 B2 | 3/2002 |
| JP | 2002-161336 A | 6/2002 |
| JP | 2002-256386 A | 9/2002 |
| JP | 2002-317245 A | 10/2002 |
| JP | 2004-232011 A | 8/2004 |
| JP | 3596316 B2 | 12/2004 |
| JP | 2005-105367 A | 4/2005 |
| JP | 2005-273002 A | 10/2005 |
| JP | 2006-045615 A | 2/2006 |
| JP | 2006-161064 A | 6/2006 |
| JP | 2007-146241 A | 6/2007 |
| JP | 2008-280608 A | 11/2008 |
| JP | 2009-209384 | 9/2009 |
| JP | 2010-053446 A | 3/2010 |
| TW | 20091203 A | 3/2009 |

OTHER PUBLICATIONS

Chinese Official Action dated Jul. 11, 2014 along with English translation from corresponding Chinese Application No. 201180027075.3.
Supplementary European Search Report dated Oct. 29, 2015 of corresponding European Application No. 11789431.1.

\* cited by examiner

HIGH STRENGTH GALVANIZED STEEL SHEET HAVING EXCELLENT BENDABILITY AND WELDABILITY, AND METHOD OF MANUFACTURING THE SAME

RELATED APPLICATIONS

This is a divisional of U.S. application Ser. No. 13/698,301, filed Nov. 16, 2012, which is a § 371 of International Application No. PCT/JP2011/002999, with an international filing date of May 30, 2011 (WO 2011/152017 A1, published Dec. 8, 2011), which is based on Japanese Patent Application Nos. 2010-125306, filed May 31, 2010, and 2011-118173, filed May 26, 2011.

TECHNICAL FIELD

This disclosure relates to a high strength galvanized steel sheet having excellent bendability and weldability with tensile strength (TS) of 980 MPa or larger, which steel sheet is suited for use as an automobile component to be subjected to severe bending process or the like, and a method of producing the same.

The term "galvanized steel sheet" collectively refers to a so-called "galvannealed" steel sheet that has been subjected to alloy annealing treatment subsequent to hot-dip galvanization.

BACKGROUND

A high strength galvanized steel sheet for use as an automobile component or the like is required to have excellent workability as well as high strength, due to the nature of its application.

Recently, as a vehicle body becomes increasingly lightweight in view of improving fuel efficiency, a high strength steel sheet is required to be used in an automobile body to ensure collision safety, and the scope of application of such a high strength steel sheet is expanding. Further, although a high strength steel sheet is normally subjected to light shaping in the conventional technique, it is now being studied to apply the high strength steel sheet to a complex shape.

However, the workability of a steel sheet generally deteriorates as the strength thereof increases. Accordingly, when a high strength steel sheet is applied to a vehicle body, there arises a problem such as fracturing when the steel sheet is subjected to press forming. In particular, the aforementioned problem is likely to occur in applying a high strength steel sheet having a tensile strength of 980 MPa or larger to a component that is to be bent/formed.

Further, since vehicle body processing involves an assembly process subsequent to press forming and it is necessary to perform resistance spot welding in the assembly process, excellent weldability is also required along with workability.

To meet the above-mentioned requirements, for example, JP-A 2004-232011, JP-A 2002-256386, JP-A 2002-317245, JP-A 2005-105367, JP-B 3263143, JP-B 3596316, and JP-A 2001-011538 each propose a method of obtaining a high strength galvanized steel sheet with high workability by specifying steel components and structures or optimizing hot rolling conditions and annealing conditions. Further, JP-A 02-175839, JP-A 05-195149, JP-A 10-130782, JP-A 2005-273002, and JP-A 2002-161336 each disclose a technology of obtaining a cold-rolled steel sheet excellent in bendability, JP-A 2006-161064 discloses a technology of obtaining a high tensile strength galvanized steel sheet excellent in bendability, and JP-A 2008-280608 discloses a technology of providing a galvanized steel sheet excellent in workability and weldability.

Among the above-cited publications, JP-A 2004-232011 describes a steel satisfying a tensile strength of 980 MPa or so and having a high content of C and Si. However, JP-A 2004-232011 gives no consideration to improvement in stretch flangeability and bendability.

Similarly, JP-A 2002-256386, JP-A 2002-317245 and JP-A 2005-105367 each disclose a steel member that utilizes Cr, but gives no consideration to improvement in stretch flangeability and bendability.

JP-B 3263143, JP-B 3596316, and JP-A 2001-011538 each refer to ductility ratio $\lambda$, which is one of the indexes for evaluating stretch flangeability. However, the tensile strengths (TS) of steel sheets, subjected to the measurement of the ductility ratio, of these publications fail to reach 980 MPa. Further, these publications are silent about bendability of the steel sheets thereof.

JP-A 02-175839, JP-A 05-195149, JP-A 10-130782, JP-A 2005-273002 each disclose a technology involving bendability of steel sheets by softening the steel sheets in regions measured from surfaces thereof in the thickness direction to a depth of at least 10 vol % or at least 10 μm. However, there arises a problem in that the soft layer in the steel sheet surface layer is so thick that fatigue strength deteriorates.

JP-A 2002-161336 describes that a steel sheet can be improved in bendability when a soft layer is formed in the steel sheet surface to a depth up to 10 μm. However, JP-A 2002-161336 fails to specify the steel sheet structure and thus inevitably faces a problem that fatigue strength of the steel sheet decreases as a whole.

JP-A 2006-161064, although it discloses improving bendability of a steel sheet by setting the area ratio of a ferrite phase to be 80% or more in vicinities of the top surfaces (a depth of 1 to 10 μm measured from the surface layer) of the steel sheet, fails to make any reference to the internal structure of the steel sheet. Further, JP-A 2006-161064 has no description of weldability and plane-bending fatigue properties of the steel sheet, thereby still having a problem in terms of weldability and plane-bending fatigue properties.

JP-A 2008-280608 discloses a high strength galvanized steel sheet excellent in workability and weldability, as well as bendability to attain a critical bend radius not larger than 1.5t (hereinafter, t represents sheet thickness of the steel sheet) at 90° V-bending. JP-A 2008-280608 has actually achieved a critical bend radius as small as 0.36t. However, to further expand the scope of application of the high strength steel sheet to a vehicle body, bendability needs to be further increased, that is, critical bend radius needs to be further reduced. Specifically, critical bend radius not larger than 0.3t is required.

It could therefore be helpful to provide a high strength galvanized steel sheet having very good bendability and weldability, which specifically has high tensile strength of 980 MPa or larger and satisfies a durability ratio, defined as fatigue limit/tensile strength, of 0.35 or larger without deteriorating the plane-bending fatigue property, as well as an advantageous production method of the steel sheet.

SUMMARY

The term "high strength" means tensile strength of 980 MPa or larger. Further, the expression that a steel sheet "has excellent bendability" means that a critical bend radius at 90° V-bending is not larger than 0.3t. Yet further, the expression that a steel sheet "is excellent in weldability"

means that a base material fracture occurs when a nugget diameter is 4t$^{1/2}$ (mm) or larger.

We discovered that:
(1) Excellent weldability can be achieved by reducing contents of C, P, and S in a composition of a steel sheet components.
(2) To improve bendability, it is effective to form the steel sheet surface layer structure mainly of a ferrite phase, specifically, form more than 70% by a volume fraction of the steel sheet surface layer structure of a ferrite phase to soften the structure. In this case, the fatigue resistance property deteriorates due to the softening of the steel sheet surface layer in turn.

However, if the thickness of the steel sheet surface layer formed mainly of a ferrite phase is set not to exceed 10 μm or so, the aforemetioned adverse effect on fatigue resistance property can be suppressed while achieving significant improvement in bendability.
(3) On the other hand, a steel sheet structure on the inner side than the steel sheet surface layer needs to include a ferrite phase to a certain extent, specifically, at least about 20% by a volume fraction to ensure bendability. However, when the ferrite phase of the inner structure exceeds 70%, the fatigue resistance property deteriorates, making it difficult to ensure the strength of 980 MPa or larger.

We thus provide:
1. A high strength galvanized steel sheet having excellent bendability and weldability, comprising by mass %: C: equal to or more than 0.05% and less than 0.12%; P: 0.001 to 0.040%; and S: equal to or less than 0.0050%, wherein a steel sheet surface layer, constituting a portion of the steel sheet up to a depth of 10 μm measured from each surface of the steel sheet, has a structure containing more than 70% of ferrite phase by a volume fraction, a steel sheet inner layer portion, on the inner side than the depth of 10 μm measured from each surface, has a structure containing 20 to 70% by a volume fraction of ferrite phase with an average crystal grain size equal to or smaller than 5 μm, the steel sheet has a tensile strength equal to or larger than 980 MPa, and the steel sheet has a galvanized layer on a surface thereof.
2. The high strength galvanized steel sheet having excellent bendability and weldability according to the above-mentioned item 1, wherein the structure of the steel sheet inner layer portion contains: 20 to 70% of ferrite phase by a volume fraction, with an average crystal grain size equal to or smaller than 5 μm; 30 to 80% of bainite phase and/or martensitic phase by a volume fraction, with an average crystal grain size of equal to or smaller than 5 μm; and residual austenite phase and/or pearlite phase equal to or less than 5% (inclusive of 0%) by a volume fraction as the remainder.
3. The high strength galvanized steel sheet having excellent bendability and weldability according to the above-mentioned item 1 or 2, wherein the steel sheet, further comprising by mass %: C: equal to or more than 0.05% and less than 0.12%; P: 0.001 to 0.040%; S: equal to or less than 0.0050%; Si: 0.01 to 1.6%; Mn: 2.0 to 3.5%; Al: 0.005 to 0.1%; N: equal to or less than 0.0060%; and the remainder as Fe and incidental impurities.
4. The high strength galvanized steel sheet having excellent bendability and weldability according to the above-mentioned item 3, further comprising by mass %: at least one element selected from the groups consisting of Cr: more than 0.5% and equal to or less than 2.0%, Mo: 0.01 to 0.50%, and B: 0.0001 to 0.0030%; and the remainder as Fe and incidental impurities.
5. The high strength galvanized steel sheet having excellent bendability and weldability according to the above-mentioned item 3 or 4, further comprising by mass %: at least one element selected from the group consisting of Ti: 0.010 to 0.080% and Nb: 0.010 to 0.080%; and the remainder as Fe and incidental impurities.
6. The high strength galvanized steel sheet having excellent bendability and weldability according to the above-mentioned item 5, comprising by mass %: C: equal to or more than 0.05% and less than 0.12%; P: 0.001 to 0.040%; S: equal to or less than 0.0050%; Si: 0.01 to 1.6%; Mn: 2.0 to 3.5%; Al: 0.005 to 0.1%; N: equal to or less than 0.0060%; Cr: more than 0.5% and equal to or less than 2.0%; Mo: 0.01 to 0.50%; Ti: 0.010 to 0.080%; Nb: 0.010 to 0.080%; B: 0.0001 to 0.0030%; and the remainder as Fe and incidental impurities.

Specifically, the steel sheet described in the above-mentioned item 6 is the high strength galvanized steel sheet having excellent bendability and weldability according to the above-mentioned item 1 or 2, characteristically containing by mass %, C: equal to or more than 0.05% and less than 0.12%, P: 0.001 to 0.040%, S: equal to or less than 0.0050%; Si: 0.01 to 1.6%, Mn: 2.0 to 3.5%, Al: 0.005 to 0.1%, N: equal to or less than 0.0060%, Cr: more than 0.5% and equal to or less than 2.0%, Mo: 0.01 to 0.50%, Ti: 0.010 to 0.080%, Nb: 0.010 to 0.080%, and B: 0.0001 to 0.0030%, and the remainder as Fe and incidental impurities.
7. A method of manufacturing a galvanized steel sheet including subjecting a steel slab having a composition comprising by mass: C: equal to or more than 0.05% and less than 0.12%; P: 0.001 to 0.040%; S: equal to or less than 0.0050%; Si: 0.01 to 1.6%; Mn: 2.0 to 3.5%; Al: 0.005 to 0.1%; N: equal to or less than 0.0060%; and the remainder as Fe and incidental impurities, to heating at a temperature of 1150° C. to 1300° C. and then hot rolling the slab at a finisher delivery temperature of 850 to 950° C. to form a steel sheet; cooling the steel sheet from the finisher delivery temperature to (the finisher delivery temperature minus 100° C.) at an average cooling rate of 5 to 200° C./second; winding up the steel sheet into a coil at a temperature of 400 to 650° C.; subjecting the steel sheet to pickling and cold rolling; and subjecting the steel sheet to annealing including a two-stage temperature raising process, wherein the annealing step includes: primary heating the steel sheet from 200° C. to an intermediate temperature of 500 to 800° C. at a primary average heating rate of 5 to 50° C./second at an excess air ratio of 1.10 to 1.20 maintained up to the intermediate temperature; secondary heating the steel sheet from the intermediate temperature to an annealing temperature of 730 to 900° C. at a secondary average heating rate of 0.1 to 10° C./second at an excess air ratio of less than 1.10 maintained up to the annealing temperature; holding the steel sheet in a range of the annealing temperature for 10 to 500 seconds; cooling the steel sheet to a temperature of 450 to 550° C. at an average cooling rate of 1 to 30° C./second; and subjecting the steel sheet to a galvanizing process and, optionally, an alloying process.
8. A method of manufacturing a galvanized steel sheet including subjecting a steel slab having a composition comprising by mass %: C: equal to or more than 0.05% and less than 0.12%; P: 0.001 to 0.040%; S: equal to or less than 0.0050%; Si: 0.01 to 1.6%; Mn: 2.0 to 3.5%; Al: 0.005 to 0.1%; N: equal to or less than 0.0060%; and at least one element selected from the group consisting of Cr: more than 0.5% and equal to or less than 2.0%, Mo: 0.01% to 0.50%, and B: 0.0001% to 0.0030%, the remainder as Fe and incidental impurities, to heating at a temperature of 1150° C. to 1300° C. and then hot rolling the slab at a finisher delivery temperature of 850 to 950° C. to form a steel sheet; cooling the steel sheet from the finisher delivery temperature to (the finisher delivery temperature minus 100° C.) at an average cooling rate of 5 to 200° C./second; winding up the steel sheet into a coil at a temperature of 400 to 650° C.; subjecting the steel sheet to pickling and cold rolling; and subjecting the steel sheet to annealing including a two-stage temperature raising process, wherein the annealing step includes: primary heating the steel sheet from 200° C. to an intermediate temperature of 500 to 800° C. at a primary average heating rate of 5 to 50° C./second at an excess air ratio of 1.10 to 1.20 maintained up to the intermediate temperature; secondary heating the steel sheet from the intermediate temperature to an annealing temperature of 730 to 900° C. at a secondary average heating rate of 0.1 to 10° C./second at an excess air ratio of less than 1.10 maintained up to the annealing temperature; holding the steel sheet in a range of the annealing temperature for 10 to 500 seconds; cooling the steel sheet to a temperature of 450 to 550° C. at an average cooling rate of 1 to 30° C./second; and subjecting the steel sheet to a galvanizing process and, optionally, an alloying process.

9. A method of manufacturing a galvanized steel sheet including subjecting a steel slab having a composition comprising by mass %: C: equal to or more than 0.05% and less than 0.12%; P: 0.001 to 0.040%; S: equal to or less than 0.0050%; Si: 0.01 to 1.6%; Mn: 2.0 to 3.5%; Al: 0.005 to 0.1%; N: equal to or less than 0.0060%; and at least one element selected from the group consisting of Ti: 0.010% to 0.080% and Nb: 0.010 to 0.080%, the remainder as Fe and incidental impurities, to heating at a temperature of 1150° C. to 1300° C. and then hot rolling the slab at a finisher delivery temperature of 850 to 950° C. to form a steel sheet; cooling the steel sheet from the finisher delivery temperature to (the finisher delivery temperature minus 100° C.) at an average cooling rate of 5 to 200° C./second; winding up the steel sheet into a coil at a temperature of 400 to 650° C.; subjecting the steel sheet to pickling and cold rolling; and subjecting the steel sheet to annealing including a two-stage temperature raising process, wherein the annealing step includes: primary heating the steel sheet from 200° C. to an intermediate temperature of 500 to 800° C. at a primary average heating rate of 5 to 50° C./second at an excess air ratio of 1.10 to 1.20 maintained up to the intermediate temperature; secondary heating the steel sheet from the intermediate temperature to an annealing temperature of 730 to 900° C. at a secondary average heating rate of 0.1 to 10° C./second at an excess air ratio of less than 1.10 maintained up to the annealing temperature; holding the steel sheet in a range of the annealing temperature for 10 to 500 seconds; cooling the steel sheet to a temperature of 450 to 550° C. at an average cooling rate of 1 to 30° C./second; and subjecting the steel sheet to a galvanizing process and, optionally, an alloying process.

10. A method of manufacturing a galvanized steel sheet including subjecting a steel slab having a composition by mass %: C: equal to or more than 0.05% and less than 0.12%; P: 0.001 to 0.040%; S: equal to or less than 0.0050%; Si: 0.01 to 1.6%; Mn: 2.0 to 3.5%; Al: 0.005 to 0.1%; N: equal to or less than 0.0060%; at least one element selected from the group consisting of Cr: more than 0.5% and equal to or less than 2.0%, Mo: 0.01% to 0.50%, and B: 0.0001% to 0.0030%; and at least one element selected from the group consisting of: Ti: 0.010% to 0.080% and Nb: 0.010% to 0.080%, the remainder as Fe and incidental impurities, to heating at a temperature of 1150° C. to 1300° C. and then hot rolling the slab at a finisher delivery temperature of 850 to 950° C. to form a steel sheet; cooling the steel sheet from the finisher delivery temperature to (the finisher delivery temperature minus 100° C.) at an average cooling rate of 5 to 200° C./second; winding up the steel sheet into a coil at a temperature of 400 to 650° C.; subjecting the steel sheet to pickling and cold rolling; and subjecting the steel sheet to annealing including a two-stage temperature raising process, wherein the annealing step includes: primary heating the steel sheet from 200° C. to an intermediate temperature of 500 to 800° C. at a primary average heating rate of 5 to 50° C./second at an excess air ratio of 1.10 to 1.20 maintained up to the intermediate temperature; secondary heating the steel sheet from the intermediate temperature to an annealing temperature of 730 to 900° C. at a secondary average heating rate of 0.1 to 10° C./second at an excess air ratio of less than 1.10 maintained up to the annealing temperature; holding the steel sheet in a range of the annealing temperature for 10 to 500 seconds; cooling the steel sheet to a temperature of 450 to 550° C. at an average cooling rate of 1 to 30° C./second; and subjecting the steel sheet to a galvanizing process and, optionally, an alloying process.

11. A method of manufacturing a galvanized steel sheet including subjecting a steel slab having a composition comprising by mass %: C: equal to or more than 0.05% and less than 0.12%; P: 0.001 to 0.040%; S: equal to or less than 0.0050%; Si: 0.01 to 1.6%; Mn: 2.0 to 3.5%; Al: 0.005 to 0.1%; N: equal to or less than 0.0060%; and the remainder as Fe and incidental impurities, to heating at a temperature of 1150° C. to 1300° C. and then hot rolling the slab at a finisher delivery temperature of 850 to 950° C. to form a steel sheet; cooling the steel sheet from the finisher delivery temperature to (the finisher delivery temperature minus 100° C.) at an average cooling rate of 5 to 200° C./second; winding up the steel sheet into a coil at a temperature of 400 to 650° C.; subjecting the steel sheet to pickling and cold rolling; and subjecting the steel sheet to annealing including a two-stage temperature raising process, wherein the annealing step includes: primary heating the steel sheet from 200° C. to an intermediate temperature of 500 to 800° C. at a primary average heating rate of 5 to 50° C./second at an excess air ratio of 1.10 to 1.20 maintained up to the intermediate temperature; secondary heating the steel sheet from the intermediate temperature to an annealing temperature of 730 to 900° C. at a secondary average heating rate of 0.1 to 10° C./second at an excess air ratio of less than 1.10 maintained up to the annealing temperature; holding the steel sheet in a range of the annealing temperature for 10 to 500 seconds; cooling the steel sheet to a temperature of 450 to 550° C. at an average cooling rate of 1 to 30° C./second; and subjecting the steel sheet to a galvanizing process and, optionally, an alloying process, wherein a steel sheet surface layer, constituting a portion of the steel sheet up to a depth of 10 μm measured from each surface of the steel sheet, has a structure containing more than 70% and equal to or less than 88% of ferrite phase by a volume fraction, a steel sheet inner layer portion, on an inner side than the depth of 10 μm measured from each surface, has a structure containing 20 to 70% by a volume fraction of ferrite phase with an average crystal grain size equal to or smaller than 5 μm, 30 to 80% of bainite phase and/or martensitic phase by a volume fraction, with an average crystal grain size of equal to or smaller than 5 μm, and residual austenite phase and/or pearlite phase equal to or less than 5% (inclusive of 0%) by a volume fraction as the remainder, the steel sheet has 1) a tensile strength equal to or larger than 980 MPa, 2) a galvanized layer on a surface thereof, 3) a durability ratio, defined as fatigue limit/tensile strength of 035 or larger, and 4) a limit bending radius equal to or smaller than 0.3t (t is a sheet thickness of the steel sheet).

A high strength galvanized steel sheet which is effectively improved in bendability and weldability can be obtained. This high strength galvanized steel can satisfy both the strength and the workability necessitated by an automobile component and thus can be suitably used for an automobile component which is to be press formed into a shape requiring severe bending.

DETAILED DESCRIPTION

First, descriptions will be given for limiting compositions of the components of the steel sheet to the above-mentioned ranges. "%" regarding a content of each component of the steel sheet represents "mass %" unless otherwise specified.

C: 0.05% or More and Less than 0.12%

C is an indispensable element in terms of strengthening steel by utilizing a hard phase such as a martensitic phase or a bainite phase. 0.05% or more of C is required to obtain a tensile strength (which will be referred to as "TS" hereinafter) of 980 MPa or more. As the C content increases, TS increases accordingly. In a case where the C content is 0.12% or more, not only spot weldability significantly deteriorates, but also workability such as bendability tends to significantly deteriorate due to hardening caused by increase in the hard phase. The C content is thus to be limited to 0.05% or more and less than 0.12%. The C content is more preferably 0.105% or less. In view of stably ensuring TS of 980 MPa or larger, the C content is preferably 0.08% or more.

P: 0.001 to 0.040%

P is an element that contributes to improving strength and the content thereof is 0.001% or more. However, the element P deteriorates weldability. Weldability improves when a steel sheet surface layer portion ranging from a surface of a steel sheet up to the 10 μm depth of the steel sheet, i.e., from an interface between the steel sheet and an zinc plating up to the 10 μm depth of the steel sheet (which surface layer portion will be referred to simply as a "steel sheet surface layer portion" hereinafter) contains ferrite by a volume fraction of 70% or more. In a case where the P content exceeds 0.040%, P significantly causes an adverse effect of deteriorating weldability. The P content is therefore to be limited to 0.001 to 0.040%, preferably 0.001 to 0.025%, and more preferably 0.001 to 0.015%.

S: 0.0050% or less

Weldability deteriorates as the S content increases. In particular, in a case where the S content exceeds 0.0050%, sulfur significantly causes an effect of deteriorating weldability. Further, an increase in the S content not only causes red shortness and incurs problems such as fracture of a hot-rolled sheet, but also forms MnS as inclusions in a steel sheet, which remains as sheet-like inclusions after cold rolling to deteriorate ultimate deformability of the material or formability such as stretch flangeability. Therefore, the S content is preferably as low as possible, although it may be tolerated up to 0.0050%. The S content is preferably 0.0030% or less. However, since excessive reduction of the S content results in increase in desulfurizing cost in the steelmaking process, the lower limit of the S content is preferably about 0.0001%.

Contents of C, P, and S are specified as described above to attain excellent weldability. It is effective to include, for example, Si, Mn, or Al in the steel sheet to obtain desired characteristics, in particular, to improve strength and weldability. Further, to improve the quench hardenability, it is also effective to add one or more elements selected from among Cr, Mo, and B in a predetermined content. Yet further, one or two elements selected from Ti and Nb can be added in a predetermined content as an element capable of facilitating precipitation, to further improve bendability. For the reasons described above, it is preferable to appropriately include, Si: 0.01 to 1.6%, Mn: 2.0 to 3.5%, Al: 0.005 to 0.1%, Cr: more than 0.5% and 2.0% or less, Mo: 0.01 to 0.50%, Ti: 0.010 to 0.080%, Nb: 0.010 to 0.080%, and B: 0.0001 to 0.0030%, respectively. It is preferable to limit the content of N to 0.0060% or less because an increase in content of N significantly affects ductility of the steel sheet as described below.

Si: 0.01 to 1.6%

Si is an element that contributes to improving strength and bendability of the steel sheet through solid solution strengthening. However, the Si content needs to be 0.01% or more to cause a good effect of Si addition. However, in a case where the Si content exceeds 1.6%, Si is concentrated as an oxide on the steel sheet surface, causing plating failure. The Si content is therefore preferably 0.01 to 1.6%. The Si content is more preferably 0.8% or less, further more preferably less than 0.35%, and most preferably 0.20% or less to avoid plating failure.

Mn: 2.0 to 3.5%

Manganese effectively contributes to improving strength and this effect is recognizable when the Mn content is 2.0% or more. In a case where the Mn content exceeds 3.5%, the structure suffers from localized variation in transformation point due to segregation of Mn or the like. As a result, the steel sheet has a non-uniform structure in which a ferrite phase and a martensitic phase exist in the form of bands, resulting in poor bendability. Further, in this case, Mn is concentrated as an oxide on the steel sheet surface, causing plating failure. The Mn content is thus 2.0 to 3.5%, preferably 2.2 to 2.8%.

Al: 0.005 to 0.1%

Al is an element which is effective as a deoxidizing agent in the steelmaking process and also useful for separating a non-metal inclusion which would deteriorate bendability away into slag. Further, Al has a function of suppressing generation of Mn/Si-oxides, which would adversely affect plating properties during annealing and thus improve appearance of a plating surface. The Al content needs to be 0.005% or more to obtain such good effects. In a case where the Al content thus added exceeds 0.1%, not only the steelmaking cost is increased but also weldability deteriorates. The Al content is therefore 0.005 to 0.1%, and preferably 0.01 to 0.06%.

N: 0.0060% or less

To improve ductility by making ferrite clean, the N content is preferably as low as possible. In particular, in a case where the N content exceeds 0.0060%, ductility is significantly deteriorated. Therefore, the upper limit of the N content is to be 0.0060%. The lower limit of the N content is preferably 0.0001% or so in view of the refining cost. In short, the N content is to be 0.0060% or less, and preferably in the range of 0.0001 to 0.0060%.

Cr: More than 0.5% and 2.0% or Less

Cr is an element which is effective in facilitating quench hardening of steel. Cr also improves quench hardenability of an austenite phase, makes a hard phase extend uniformly such that the hard phase is finely dispersed, and effectively contributes to the improvement in stretch flangeability and bendability. The Cr content needs to be more than 0.5% to cause a good effect of Cr addition. However, in a case where the Cr content exceeds 2.0%, this good effect reaches a plateau and the surface quality rather deteriorates. The Cr content is therefore more than 0.5% and 2.0% or less, and preferably more than 0.5% and 1.0% or less.

Mo: 0.01 to 0.50%

Mo is an element which is effective in facilitating quench hardening of steel. A very small amount of Mo added to a low-carbon steel component system readily ensures good strength of steel. Further, Mo causes an effect of improving weldability and bendability. The Mo content needs to be 0.01% or more to cause the good effect of Mo addition. In a case where the Mo content exceeds 0.50%, the good effect reaches a plateau and the production cost may rise up. The Mo content is thus 0.01 to 0.50% and preferably 0.01 to 0.35%.

Ti: 0.010 to 0.080%

Ti reacts with C or N in steel to form a fine carbide or a fine nitride, to thereby grain-refine a hot rolled sheet structure and a steel sheet structure after annealing to improve bendability, and also effectively facilitate precipitation. The Ti content needs to be 0.010% or more to cause a good effect. In a case where the Ti content exceeds 0.080%, this good effect reaches a plateau and an excessive amount of precipitates is generated in ferrite, which deteriorates ductility of ferrite. The Ti content is 0.010 to 0.080%, and preferably 0.010 to 0.060%.

Nb: 0.010 to 0.080%

Nb is an element that contributes to improving strength of a steel sheet by facilitating solid solution or precipitation. Nb also has an effect of strengthening the ferrite phase to reduce the difference in hardness between the ferrite and martensitic phases, to thereby effectively contribute to improving stretch flangeability. Further, Nb contributes to grain-refining of ferrite grains and crystal grains in the bainite/martensitic region, thereby improving bendability. The Nb content needs to be 0.010% or more to cause a good effect of Nb addition. In a case where the Nb content exceeds 0.08%, the hot-rolled sheet is hardened, which results in an increase in rolling load during hot rolling or cold rolling. Further, in this case, ductility of ferrite deteriorates and workability is impaired. The Nb content is thus 0.010 to 0.080%. In view of achieving good strength and workability, the Nb content is preferably 0.030 to 0.070%.

B: 0.0001 to 0.0030%

Boron contributes to improving quench hardenability, suppressing generation of ferrite which occurs in the annealing cooling process, and obtaining a desired amount of the hard phase, to thereby improve bendability. The B content needs to be 0.0001% or more to cause a good effect. In a case where the B content exceeds 0.0030%, the good effect reaches a plateau. The B content is therefore 0.0001 to 0.0030% and preferably 0.0005 to 0.0020%.

Specifically, a particularly preferable example of an element composition is as follows:
 (1) A composition containing C: 0.05% or more and less than 0.12%, P: 0.001 to 0.040%, S: 0.0050% or less, Si: 0.01 to 1.6%, Mn: 2.0 to 3.5%, Al: 0.005 to 0.1%, and N: 0.0060% or less, and Fe and incidental impurities as the remainder.
 (2) A composition containing, in addition to the composition of (1) above, one or more elements selected from the group consisting of Cr: more than 0.5% and 2.0% or less, Mo: 0.01 to 0.50%, and B: 0.0001 to 0.0030%.
 (3) A composition containing, in addition to the composition of (1) or (2) above, one or two elements selected from Ti: 0.010 to 0.080% and Nb: 0.010 to 0.080%.

The most preferable example of an element composition is as follows:
 A composition containing C: 0.05% or more and less than 0.12%, P: 0.001 to 0.040%, S: 0.0050% or less, Si: 0.01 to 1.6%, Mn: 2.0 to 3.5%, Al: 0.005 to 0.1%, N: 0.0060% or less, Cr: more than 0.5% and 2.0% or less, Mo: 0.01 to 0.50%, Ti: 0.010 to 0.080%, Nb: 0.010 to 0.080%, B: 0.0001 to 0.0030%, and Fe and incidental impurities as the remainder.

The element composition may further optionally contain following elements in an appropriate manner. Ca causes an effect of improving ductility by shape control of a sulfide such as MnS. If the Ca content increases too much, the effect tends to reach a plateau. In view of this, when Ca is contained, the content thereof is 0.0001 to 0.0050% and more preferably 0.0001 to 0.0020%.

Further, Vanadium has an effect of strengthening a ferrite phase through formation of carbide. However, a too large V content rather deteriorates ductility of the ferrite phase. The V content is therefore preferably 0.001% or more and less than 0.05% and more preferably 0.001% or more and less than 0.005%.

Further, it is preferable that the element composition includes REM capable of controlling sulfide inclusion morphology without significantly changing plating properties to thereby effectively contribute to improving workability, or Sb capable of rendering crystal grains of a steel sheet surface layer uniform by a content of 0.0001 to 0.1%, respectively.

Contents of other elements such as Zr, Mg which would form precipitates are preferably as low as possible. Therefore, it is not necessary to intentionally add these elements. The contents of these other elements are tolerated up to less than 0.0200% and preferably less than 0.0002%.

Cu and Ni are elements that adversely affect weldability and appearance of a galvanized surface, respectively. The Cu and Ni contents are tolerated up to less than 0.4% and preferably less than 0.04%.

In the steel sheet, the remainder other than the aforementioned component elements is preferably constituted of Fe and incidental impurities.

Next, descriptions will be given of appropriate content ranges regarding a steel structure, which are critical requirements, as well as the reasons for specifying the ranges as such.

Structure Having a Steel Sheet Surface Layer Portion Containing More than 70% by Volume Fraction of Ferrite Phase Bendability of a steel sheet can be improved by designing a structure of a steel sheet surface layer portion as a structure mainly constituted of a ferrite phase. This effect cannot be obtained when the volume fraction of the ferrite phase is 70% or less. Accordingly, the volume fraction of the ferrite phase in the steel sheet surface layer portion is to be more than 70%, and preferably equal to or more than 85%.

Observation of a structure of the steel sheet is carried out by: photographing a surface parallel to the rolling direction of the steel sheet by using a scanning electron micrograph (SEM) at an appropriate magnification of about 1,000 to 3,000-fold magnification; selecting three arbitrary sites in a steel sheet surface layer portion in the photography thus obtained; and calculating a volume fraction of ferrite or the like in these sites.

In the high strength galvanized steel sheet, an inner layer portion of the steel sheet, located deeper than 10 μm measured from the steel sheet surface, has a structure containing at least 20 to 70% volume fraction of a ferrite phase with an average crystal grain size of 5 μm or less.

A structure of a portion of a steel sheet, located on the inner side of a steel sheet surface layer up to the center in thickness direction of the steel sheet, which portion will be referred to as a "steel sheet inner layer portion" hereinafter, is specifically represented by a structure of a region located in the depth range of 10 to 50 μm with thickness of 40 μm and a structure of a region of 40 μm thickness located at the ¼ sheet thickness position measured from the surface. The structures at both positions are observed, and in a case where a ferrite phase with the average crystal grain size of 5 μm or less exists at 20 to 70% volume fraction at both of the positions, it is determined that the steel sheet inner layer portion satisfies the above-mentioned structure. Specifically, SEM images of the structures of a region located from the 10 μm depth to the 50 μm depth measured from the steel sheet surface or the steel sheet/zinc plating interface toward the center of the steel sheet (a region extending by 40 μm in the depth direction and by 20 μm in the rolling direction); and a region located at a position of the ¼ sheet thickness (a region extending by 40 μm in the depth direction and by 20 μm in the rolling direction) are taken, respectively, at an appropriate magnification of about 1,000 to 3,000-fold magnification, for a surface in the rolling direction of the steel sheet, and three arbitrary points are observed for analysis.

Volume Fraction of Ferrite Phase: 20 to 70% (Steel Sheet Inner Layer)

A ferrite phase is a soft phase and contributes to ductility of a steel sheet. Hence, the structure of the steel sheet inner layer needs to contain 20% or more of a ferrite phase by a volume fraction. In a case where the volume fraction of the ferrite phase exceeds 70%, the steel sheet is excessively softened, making it difficult to ensure sufficient strength and good plane-bending fatigue property of the steel sheet. The volume fraction of a ferrite phase is therefore to be 20 to 70%, preferably in the range of 30 to 50%.

Average Crystal Grain Size of Ferrite Phase: 5 μm or Less (Steel Sheet Inner Layer)

Grain refining of crystal grains contributes to improvement in ductility, stretch flangeability, and bendability of a steel sheet. In view of this, in the steel sheet inner layer, the average crystal grain size of a ferrite phase in a multi phase structure is limited to 5 μm or less, to thereby improve bendability. In a case where the average crystal grain size of the ferrite phase exceeds 5 μm, a desired plane-bending fatigue cannot be ensured.

Further, if a soft region and a hard region are formed in a localized manner, the steel sheet is deformed non-uniformly, leading to degradation in bendability. In contrast, in a case where a soft ferrite phase and a hard martensitic phase are uniformly and finely formed, the steel sheet can be uniformly deformed during processing. The average crystal grain size of a ferrite phase is therefore preferably as small as possible. The average crystal grain size of a ferrite phase is preferably in the range of 1 to 3.5 μm to well suppress deterioration of bendability of a steel sheet.

Other aspects of the steel sheet structure than the ferrite phase in the steel sheet inner layer portion can be configured as follows.

Volume Fraction of Bainite Phase and/or Martensitic Phase: 30 to 80%

A bainite phase and/or a martensitic phase are hard phases, respectively, and each have a function of increasing strength of the steel sheet through structure reinforcement by transformation. Contents of the bainite phase and/or the martensitic phase are preferably 30% or more by a volume fraction to attain TS of 980 MPa or larger. The volume fraction of these phases is preferably 80% or less to obtain a desired bendability.

Average Crystal Grain Size of Bainite Phase and/or Martensitic Phase: 5 μm or Less Grain refining of a bainite phase and/or a martensitic phase improves hole expansion properties, bendability, and plane-bending fatigue of the steel plate. In this regard, desired properties can be attained by setting the average crystal grain size of a bainite phase and a martensitic phase in a multi phase structure at 5 μm or less, preferably 3 μm or less, in particular.

Possible structural aspects other than the aforementioned ferrite phase, martensitic phase and bainite phase in the steel sheet inner layer portion are residual austenite phase or a pearlite phase. The residual austenite phase and/or the pearlite phase do not adversely affect as long as the content thereof is 5% or less (including 0%) by a volume fraction.

Next, descriptions will be given of a preferable method of producing a high strength galvanized steel sheet.

First, a slab is manufactured through, for example, a continuous casting process or an ingot-making and blooming process from molten steel prepared to have an element composition. Then, the slab thus obtained is subjected to a series of processes in which the slab is either cooled, reheated and hot rolled or hot rolled immediately after the casting process skipping a heating process. In a case where the slab is reheated, the slab heating temperature is 1,150 to 1,300° C. to attain uniform structure of the hot rolled sheet and the finishing rolling temperature in hot rolling 850 to 950° C. to improve workability such as ductility and stretch flangeability so that formation of a structure in which a ferrite phase and a pearlite phase exist in two bands-like configuration is suppressed.

Further, the hot rolled steel is cooled from the hot finishing rolling temperature by 100° C. at an average cooling rate of 5 to 200° C./second, and a coiling temperature at which the hot rolled steel is wound into a coil is adjusted to 400 to 650° C. to improve the surface quality and easiness of cold rolling of the steel sheet, to thereby complete hot rolling. Then, the steel cold rolled, after pickling, into a desired thickness. The cold rolling reduction rate at this stage is preferably 30% or more to facilitate recrystallization of a ferrite phase to thereby improve ductility.

Next, prior to subjecting the steel sheet to a galvanizing process, the steel sheet is subjected to annealing that undergoes two-stage temperature raising processes. Structures of the surface layer portion and the inner layer portion of the steel sheet are controlled, respectively, by this annealing including two-stage temperature raising processes. Specifically, an average rate of primary heating from 200° C. to an intermediate temperature in the range of 500 to 800° C. is to be 5 to 50° C./second, and an average rate of secondary heating from the intermediate temperature to the annealing temperature in the range of 730 to 900° C. is to be 0.1 to 10° C./second. The steel sheet is then maintained at the annealing temperature in the aforementioned range for 10 to 500 seconds and cooled to a cooling stop temperature in the range of 450 to 550° C. at an average cooling rate of 1 to 30° C./second.

In the above-mentioned processes, the structure of the steel sheet surface layer portion is adjusted in a state where an excess air ratio in the annealing furnace during the primary heating is 1.10 to 1.20. An excess air ratio in the annealing furnace during the secondary heating is to be less than 1.10.

Subsequent to cooling, the steel sheet is dipped in a molten zinc bath. The coating weight of zing plating is then controlled by gas wiping or the like. The steel sheet is then optionally heated for alloying treatment and cooled to a room temperature.

A high strength galvanized steel sheet can be obtained as described above. The galvanized steel sheet may further optioanally be subjected to skinpass rolling.

An appropriate ranges of the relevant production conditions and the reason for such restrictions will be described further in detail below.

Slab Heating Temperature: 1,150 to 1,300° C.

Precipitates existing at the stage of heating a steel slab result in coarse precipitates in a steel sheet as a final product. These coarse precipitates do not contribute to improving strength, but may rather make it difficult to achieve a uniform structure of the hot rolled sheet. Therefore, it is necessary to remelt the precipitates deposited during casting. In this regard, the heating at a temperature of 1,150° C. or more can solve even Ti/Nb-precipitates, for example. Further, reheating the steel sheet to 1,150° C. or more is useful in view of scaling off defects such as blow holes and segregation in the slab surface layer and reducing cracking and irregularities at a surface of the steel sheet surface, to obtain a smooth steel sheet surface. However, heating at a temperature higher than 1,300° C. causes coarse growth of austenite grains in the steel sheet structure, which results in a coarse structure of the final product and poor ductility thereof. Accordingly, the slab heating temperature is 1,150 to 1,300° C.

Finishing Rolling Temperature: 850 to 950° C.

Bendability (ductility, stretch flangeability) can be significantly improved by setting the finishing rolling temperature during in hot rolling at 850° C. or higher. In a case where the temperature falls short of 850° C., crystals which have been subjected to hot rolling have processed or wrought structures, whereby ductility of the steel sheet deteriorates. Further, if Mn, which acts as an element for stabilizing austenite, is segregated in a cast piece, the transformation point of $Ar_3$ in the region is lowered and the austenite range expands to a relatively low temperature, whereby (in the case where finishing rolling temperature is below 850° C.) the unrecrystalized temperature range and the rolling end temperature fall within the same temperature range and unrecrystallized austenite eventually remains during hot rolling. Uniform deformation of the material during processing is inhibited and it is difficult to obtain excellent bendability in such a non-uniform structure.

On the other hand, in a case where the finishing rolling temperature exceeds 950° C., the production of oxide (scale) rapidly increases, whereby the interface between the base metal and the oxide is roughened and the surface quality after pickling and cold rolling tends to deteriorate. In this case, if a portion of the hot rolling scale fails to be removed and remains as residue after pickling, the residue will adversely affect weldability in resistance spot welding. Further, in this case, the crystal grain size may grow excessively coarse, thereby causing surface roughness in a pressed product during a forming process. Accordingly, the finishing rolling temperature is 850 to 950° C., and preferably 900 to 930° C.

Average Cooling Rate Between Finishing Rolling Temperature and (Finishing Rolling Temperature Minus 100° C.): 5 to 200° C./Second In a case where the cooling rate in a high temperature range immediately after the finishing rolling (finishing temperature to (finishing temperature minus 100° C.)) is lower than 5° C./second, a steel sheet after hot rolling experiences recrystallization and grain growth, which leads to a coarse structure of the hot rolled sheet structure in which ferrite and pearlite are formed in layers to exhibit a layered bands-like structure. In a case where such a layered bands-like structure is formed in a steel sheet before annealing, the steel sheet is subjected to a heating process in a state where densities of components thereof are not uniform, which makes it difficult to grain-refine and uniformalize the structure of the steel sheet in a heat treatment in the galvanizing process. As a result, the steel sheet structure to be finally obtained is non-uniform, exhibiting deteriorated ductility and bendability. The average cooling rate in a range of (finishing temperature to (finishing temperature minus 100° C.)) is therefore to be equal to or higher than 5° C./sec. In a case where the average cooling rate in the range of (finishing temperature to (finishing temperature minus 100° C.)) exceeds 200° C./second, the effect of the cooling reaches a plateau and rather causes a disadvantage in cost such as a need for a cooling device exclusively for this cooling process. The average cooling rate in a range of (finishing temperature to (finishing temperature minus 100° C.)) is 5 to 200° C./second, and preferably 20 to 100° C./second.

Winding Temperature: 400 to 650° C.

In a case where the coiling temperature when the steel sheet thus rolled is wound exceeds 650° C., hot rolling scale thickness increases, whereby a steel surface after cold rolling is roughened with irregularities formed thereon and ferrite crystal grain size grow coarse, resulting in poor bendability of the steel sheet. In this case, if a portion of the hot rolling scale fails to be removed and remains as residual after pickling, the residual adversely affects weldability in resistant spot welding. In a case where the coiling temperature is lower than 400° C., strength of the hot rolled sheet is increased, whereby rolling road to be exerted on the steel sheet in the cold rolling process increases and productivity deteriorates. Accordingly, the coiling temperature is 400 to 650° C., and preferably 450 to 600° C.

Primary average heating rate (from 200° C. to an intermediate temperature): 5 to 50° C./second, Air ratio in furnace at primary heating: 1.10 to 1.20, Intermediate Temperature: 500 to 800° C.

In a case where the primary average heating rate during annealing prior to the start of galvanization is lower than 5° C./second, the steel sheet experiences coarse growth of crystal grains, which leads to deterioration in ductility and bendability. Although there is no particular upper limit of the primary average heating rate, if the rate exceeds 50° C./second, the effect caused by the cooling reaches a plateau. Accordingly, the primary average heating rate is 5 to 50° C./second, preferably 10 to 50° C./second, and more preferably 15 to 30° C./second.

In a case where the intermediate temperature between the primary heating and the secondary heating exceeds 800° C., not only the steel sheet experiences coarse growth of the crystal grains and bendability of the steel sheet deteriorates, but also a volume fraction of a ferrite phase in a structure of the steel sheet surface layer portion increases, leading to deterioration in fatigue property. In a case where the intermediate temperature is lower than 500° C., the effect caused by the primary heating reaches a plateau, eliminating difference in volume fraction of a ferrite phase between the steel sheet surface layer portion and the steel sheet inner layer of a finally obtained product. Accordingly, the intermediate temperature is 500 to 800° C. The intermediate temperature is preferably to be a temperature lower than annealing temperature by about 200° C.

An excess air ratio in an annealing furnace during the above-mentioned primary heating is generally set at 1.00 or less. However, the excess air ratio in the furnace during the primary heating is 1.10 to 1.20. By setting the excess air ratio in the furnace during the primary heating to be 1.10 to 1.20 as described above, the structure of the steel sheet surface layer portion can successfully contain more than 70% of a ferrite phase, which is the most critical feature.

If the excess air ratio in the furnace during the primary heating exceeds 1.20, the volume fraction of the ferrite phase also increases in the steel sheet inner layer portion, which results in degradation of the fatigue property of the steel sheet. In a case where the excess air ratio is less than 1.10, the volume fraction of ferrite in the steel sheet surface layer portion cannot exceed 70% as in the above-mentioned case of the conventional excess air ratio, whereby bendability fails to improve. The excess air ratio is preferably to fall to 1.12 to 1.17.

An excess air ratio represents a ratio of an amount of air in an annealing furnace with respect to a minimum amount of air required for complete combustion of combustible element, which minimum amount of air is obtained from chemical reactions associated with the complete combustion. Accordingly, the excess air ratio 1.00 means that the atmosphere in the furnace contains an amount of air equivalent to the amount of theoretical air. An excess air ratio exceeding 1.00 represents that the atmosphere in the furnace contains an amount of air excessive for complete combustion of the combustible element. An excess air ratio of less than 1.00 means that the atmosphere in the furnace cannot cause complete combustion of the combustible element.

By setting the excess air ratio in the furnace during primary heating during annealing prior to the start of galvanization in the aforementioned range, a volume fraction of a ferrite phase can be effectively increased to exceed 70% only in a structure in the steel sheet surface layer portion. Although the mechanism of this phenomenon has not been elucidated yet, we believe it is as follows.

Namely, under a condition of a relatively high excess air ratio, Fe on a steel sheet surface is oxidized to generate Fe oxide and O in the Fe oxide binds to C in the steel so that the solid solution of carbon is reduced. As a result, the volume fraction of ferrite increases only in the structure of the steel sheet surface layer portion.

Secondary average heating rate (from the intermediate temperature to the annealing temperature): 0.1 to 10° C./second, Air ratio in furnace at secondary heating: less than 1.10

In a case where the secondary average heating rate during annealing prior to the start of galvanization is higher than 10° C./second, generation of an austenite phase is delayed, which increases the volume fraction of an eventually obtained ferrite phase, making it difficult to ensure sufficient strength of the steel sheet. In a case where the secondary average heating rate is lower than 0.1° C./second, crystal grain size grows coarse, resulting in deterioration of ductility and bendability. The secondary average heating rate is 0.1 to 10° C./second, and preferably 0.5 to 5° C./second.

The excess air ratio in the furnace during the secondary heating is less than 1.10. In a case where the excess air ratio in the furnace during the secondary heating is 1.10 or higher, the volume fraction of a ferrite phase exceeds 70% in the steel sheet inner layer portion located deeper than the 10 μm depth measured from the steel sheet surface layer, as well, thereby deteriorating fatigue property of the steel sheet.

The excess air ratio in a furnace during the secondary heating can be set to be equal to or less than 1.00, which is an ordinary excess air ratio. The subsequent annealing process can be performed under an excess air ratio falling within this ordinary range, preferably 0.60 to 0.95.

Annealing Temperature: 730 to 900° C., Retention Time: 10 to 500 Seconds

In a case where the annealing temperature prior to the start of galvanization is lower than 730° C., a sufficient amount of austenite is not generated during annealing, whereby the steel sheet cannot reliably have sufficient strength. In a case where the annealing temperature is higher than 900° C., the austenite phase grow coarse during heating, which leads to decrease in amount of ferrite generated in the subsequent cooling process and deterioration of bendability of the steel sheet. Further, in this case of relatively high annealing temperature, the crystal grain size of a steel sheet structure eventually obtained tends to be large, as a whole, thereby deteriorating both ductility and bendability. The annealing temperature is therefore 730 to 900° C., preferably 750 to 850° C.

Further, in a case where the retention time is less than 10 seconds in the above-mentioned annealing temperature range, the amount of austenite phase generated during annealing is insufficient, making it difficult to ensure sufficient strength of a steel sheet as a final product. In a case where the steel sheet is subjected to annealing for a relatively long time, crystal grains of a steel sheet structure tend to grow coarse. In particular, in a case where the retention time exceeds 500 seconds, crystal grain sizes of an austenite phase and a ferrite phase during thermal annealing are excessively gross, whereby bendability of a steel sheet structure obtained after the thermal processing deteriorates. Further, such gross or coarse austenitic grain size is not preferable because a steel sheet surface may be roughened during the press forming process. Yet further, such coarse austenitic and ferrite grain sizes lead to a decreased amount of ferrite phase generated in the cooling process to the cooling stop temperature, deteriorating ductility, as well.

Accordingly, to both achieve to attain a more precisely nano-constructed structure and obtain a uniform and fine structure by reducing an influence caused by the structure prior to annealing, the retention time is 10 to 500 seconds, and preferably 20 to 200 seconds.

Average cooling rate from annealing temperature to cooling stop temperature: 1 to 30° C./second, Cooling stop temperature: 450 to 550° C.

The average cooling rate when the steel sheet is cooled to the cooling stop temperature plays an important role to controllably adjust an abundance ratio of a relatively soft ferrite phase with respect to a relatively hard bainite phase and/or martensitic phase so that the steel sheet has strength TS in a class of at least 980 MPa while retaining good workability. Specifically, in a case where the average cooling rate exceeds 30° C./second, generation of a ferrite phase during cooling is suppressed while bainite and martensitic phases are excessively generated, which ensures easily attaining TS in a class of 980 MPa, but causes deterioration of bendability.

On the other hand, in a case where the average cooling rate is lower than 1° C./second, the amount of a pearlite phase as well as the amount of ferrite phase, generated in the cooling process, is increased, whereby a high TS value cannot be ensured. Accordingly, the average cooling rate when the steel sheet is cooled to the cooling stop temperature is 1 to 30° C./second, preferably 5 to 20° C./second, and more preferably 10 to 20° C./second.

The method of cooling the steel sheet is preferably the conventional gas cooling method. Other examples of the cooling method include any conventional method such as a furnace-cooled method, a mist cooling method, a roll cooking method, a water cooling method and the like, which may also appropriately combined.

In a case where the cooling stop temperature is higher than 550° C., the steel sheet structure is transformed from an austenite phase to a pearlite phase or a bainite phase which are softer than a martensitic phase, whereby it is difficult to ensure a TS value in a class of 980 MPa. In this case, a hard residual austenite phase may be generated, but this cannot be a help because stretch flangeability is then deteriorated. In a case where the cooling stop temperature is less than 450° C., a residual austenite phase is increased due to progress of bainite transformation, making it difficult to ensure TS in a class of 980 MPa and deteriorating bendability of the steel sheet.

After the cooling is stopped as described above, the steel sheet is subjected to a hot-dip galvanizing treatment, whereby a galvanized steel sheet is obtained. After the aforementioned hot-dip galvanizing treatment, the galvanized steel sheet is further optionally subjected to an alloying treatment of reheating it by using an induction heating device or the like, to thereby obtain a galvannealed steel sheet. Conditions for the hot-dip galvanizing treatment and the alloying treatment for the steel sheet are not specifically limited and may be the conventionally-known conditions.

A coating weight of hot-dip zinc plating is preferably about 20 to 150 g/m² per one surface. In a case where the coating weight is less than 20 g/m², it is difficult to ensure sufficient corrosion resistance of a product. In a case where the coating weight exceeds 150 g/m², the corrosion resisting effect by zinc plating reaches a plateau and rather the production cost disadvantageously increases. The coating weight of zinc plating is thus preferably 30 to 70 g/m².

After the continuous annealing, the galvannealed steel sheet as a final product may be subjected to skinpass rolling for the purpose of shape correction and surface roughness adjustment. However, it should be noted that excessive skinpass rolling introduces too much deformation to the steel sheet, resulting in a roll-processed structure including wrought crystal grains and thus poor ductility. The rolling reduction rate in the skinpass rolling is therefore preferably about 0.1 to 1.5%.

EXAMPLE

Steel samples having element compositions shown in Table 1 were prepared by casting, respectively. These samples were subjected to slab heating, hot rolling, winding, cold rolling at a rolling reduction rate of 50%, continuous annealing, and galvanizing under conditions shown in Tables 2-1 and 2-2, to thereby produce a galvanized steel sheet and a galvannealed steel sheet each having thickness of 2.0 mm and coating weight of 45 g/m² per one surface. A rolling reduction rate during the cold rolling was set at 50% for all of the samples. Regarding the excess air ratio in a furnace during continuous annealing, the excess air ratio during the primary heating was set as shown in Tables 2-1 and 2-2 and the excess air ratio during the secondary heating and thereafter was set in the range of 0.8 to 1.0.

Each of the galvanized steel sheets and the galvannealed steel sheets was subjected to material tests described below and material properties thereof were investigated. The results are shown in Tables 3-1, 3-2, and 4.

The material tests and an evaluation method of material properties are as follows.

(1) Steel Sheet Structure

On a surface in parallel to the rolling direction of each steel sheet sample, SEM images of structures of a steel sheet surface layer portion, a steel sheet inner layer portion (a region located from the 10 depth to the 50 μm depth measured from the steel sheet surface) and another steel sheet inner layer portion (a region located at the ¼ sheet thickness position) are photographed, respectively, at a magnification in the range of about 1,000 to 3,000-fold magnification. A volume fraction of the steel sheet structure is determined by using these SEM images thus obtained.

Specifically, the structures of the steel sheet inner layer portions are determined by observing: a structure of a region located from the 10 μm depth to the 50 μm depth measured from the steel sheet surface or the steel sheet/zinc plating interface toward the center of the steel sheet (a region extending by 40 μm in the depth direction and by 20 μm in the rolling direction); and a region located at a position of the ¼ sheet thickness (a region extending by 40 μm in the depth direction and by 20 μm in the rolling direction), respectively.

Regarding the average crystal grain size of a ferrite phase, crystal grain size of the ferrite phase is measured according to the method specified in JIS G 0552: 1998 and the crystal grain size thus obtained is converted into the average crystal grain size. Further, volume ratios of a ferrite phase and a pearlite phase are acquired by: visually specifying a ferrite phase and a pearlite phase by using a photographic image of a sectional structure of a steel sheet at a 1,000-fold magnification; obtaining area values occupied by the ferrite phase and the pearlite phase through image analysis, respectively; and dividing the area values thus obtained by a value of the analyzed area (the area of the sectional structure image), respectively, to thereby calculate volume fractions of the ferrite phase and the pearlite phase.

An amount of residual austenite is calculated by: grinding a steel sheet to be analyzed to the ¼ sheet thickness position thereof; polishing by 0.1 mm the steel sheet thus ground, by chemical polishing to obtain a polished surface; analyzing the polished surface by Mo Kα beam from an X-ray diffractometer to measure integrated intensities of a (200) face, a (220) face, and a (311) face of fcc iron and a (200) face, a (211) face, and a (220) face of bcc iron, respectively; and obtaining a fraction (i.e., a volume fraction) of the residual austenite from these measured values.

In a steel structure of the steel sheet, the rest of the structure, other than the ferrite phase, the austenite phase, and the pearlite phase, is formed of a bainite phase and/or a martensitic phase. Therefore, the total amount of the bainite phase and the martensitic phase is regarded as the remaining portion other than the ferrite phase, the austenite phase, and the pearlite phase.

The average grain size of a bainite phase and a martensitic phase is acquired by: specifying a bainite phase and a martensite phase by using an SEM image of a 3,000-fold magnification; assuming each single continuous region as a grain and measuring sizes of grains according to a method specified in JIS G 0552: 1998; and calculating the average grain size of the bainite phase and the martensite phase, respectively, by converting the obtained grain sized thereto.

(2) Tensile Property

For each steel sheet sample, a No. 5 type test piece as specified in JIS Z 2001, having a longitudinal direction (tensile direction) orthogonal to the rolling direction, is prepared. A tensile test according to JIS Z 2241 is then performed by using the No. 5 type test piece for evaluation.

(3) Bendability (Limit Bending Radius)

Bendability is evaluated according to the V-block method as specified in JIS Z 2248. In the evaluation, generation of cracks at the outer side of a bent portion is visually observed and the minimum bending radius which allows bending without generating a crack is regarded as the limit bending radius. When the limit bending radius is equal to or smaller than 0.3t, it is judged that the bendability is good. Note that Table 4 shows values of the limit bending radius/t, as well.

(4) Weldability (Resistance Spot Welding)

First, spot welding is performed under following conditions:

Electrode: DR6 mm-40R;

Welding pressure: 4802 N (490 kgf);

Initial press time: 30 cycles/60 Hz;

Weld Time: 17 cycles/60 Hz; and

Retention Time: 1 cycle/60 Hz.

Test current is changed at 0.2 kA intervals from 4.6 to 10 kA and at 0.5 kA intervals from 10.5 kA to the welding, respectively, for the steel sheet having the same sample number.

Next, each test piece is subjected to a cross-tension test and measurement of nugget diameter at a welded portion. The cross-tension test on the resistance spot welded joint is carried out according to JIS Z 3137. The measurement of the nugget diameter is carried out according to JIS Z 3139.

A half of the plug portion in a symmetrical circular shape after resistance spot welding is cut along a section perpendicular to the steel sheet surface and substantially including the center of the welding point. The cut face is ground, etched and then subjected to optical microscopic observation of a sectional structure, to thereby measure a nugget diameter. In Examples, the maximum diameter of a molten region from which a corona bond has been excluded is assumed as the nugget diameter.

The welded material having a nugget diameter of $4t^{1/2}$ (mm) or more is subjected to cross-tension test. In a case where the welded material exhibits such good welding adhesion as to cause the base material to fracture, the weldability is evaluated as good.

(5) Plane-Bending Fatigue Test

The plane-bending fatigue test is carried out according to JIS Z 2275 under a condition of fully alternating stress (stress ratio: 1) at a frequency of 20 Hz. In a case where a durability ratio expressed as fatigue limit/TS is 0.35 or larger, plane-bending fatigue properties are evaluated as good.

TABLE 1

| Steel Symbol | Element Composition (mass %) | | | | | | | | | | | | Remarks |
|---|---|---|---|---|---|---|---|---|---|---|---|---|---|
| | C | P | S | Si | Mn | Al | N | Cr | Mo | Ti | Nb | B | |
| A | 0.051 | 0.008 | 0.0008 | 0.15 | 2.35 | 0.035 | 0.0045 | 0.95 | 0.06 | 0.045 | 0.065 | 0.0013 | Steel |
| B | 0.099 | 0.009 | 0.0009 | 0.10 | 2.25 | 0.040 | 0.0041 | 0.55 | 0.08 | 0.042 | 0.055 | 0.0012 | Steel |
| C | 0.085 | 0.008 | 0.0008 | 0.12 | 2.35 | 0.045 | 0.0038 | 0.62 | 0.10 | 0.038 | 0.048 | 0.0011 | Steel |
| D | 0.095 | 0.006 | 0.0030 | 0.05 | 2.15 | 0.045 | 0.0044 | 0.68 | 0.12 | 0.029 | 0.056 | 0.0009 | Steel |
| E | 0.070 | 0.025 | 0.0008 | 0.05 | 2.38 | 0.035 | 0.0042 | 0.58 | 0.08 | 0.034 | 0.068 | 0.0008 | Steel |
| F | 0.060 | 0.027 | 0.0007 | 0.10 | 2.65 | 0.040 | 0.0045 | 0.53 | 0.09 | 0.036 | 0.072 | 0.0014 | Steel |
| G | 0.085 | 0.006 | 0.0007 | 0.15 | 2.30 | 0.045 | 0.0038 | 0.61 | 0.08 | 0.021 | 0.039 | 0.0009 | Steel |
| H | 0.075 | 0.009 | 0.0034 | 0.25 | 2.35 | 0.035 | 0.0048 | 0.57 | 0.09 | 0.048 | 0.038 | 0.0014 | Steel |
| I | 0.105 | 0.012 | 0.0015 | 0.17 | 2.51 | 0.045 | 0.0041 | 0.74 | 0.11 | 0.025 | 0.016 | 0.0007 | Steel |
| J | 0.092 | 0.015 | 0.0020 | 0.13 | 2.42 | 0.038 | 0.0037 | 0.77 | 0.05 | 0.023 | 0.020 | 0.0005 | Steel |
| K | 0.087 | 0.017 | 0.0017 | 0.12 | 2.32 | 0.055 | 0.0020 | 0.82 | 0.03 | 0.014 | 0.027 | 0.0012 | Steel |
| L | 0.110 | 0.009 | 0.0025 | 0.24 | 2.01 | 0.027 | 0.0029 | 0.87 | 0.12 | 0.012 | 0.035 | 0.0010 | Steel |
| M | 0.082 | 0.008 | 0.0012 | 0.22 | 2.09 | 0.053 | 0.0024 | 0.52 | 0.15 | 0.017 | 0.041 | 0.0011 | Steel |
| <u>N</u> | <u>0.125</u> | 0.006 | 0.0007 | 0.05 | 2.25 | 0.050 | 0.0048 | 0.55 | 0.08 | 0.035 | 0.055 | 0.0012 | Comparative Steel |
| O | 0.095 | 0.007 | 0.0009 | 0.05 | 2.70 | 0.045 | 0.0042 | 0.15 | 0.08 | 0.034 | 0.051 | 0.0014 | Steel |
| P | 0.085 | 0.008 | 0.0008 | 0.15 | 2.70 | 0.045 | 0.0045 | 0.75 | 0.08 | 0.031 | — | 0.0009 | Steel |
| Q | 0.052 | 0.009 | 0.0008 | 0.01 | 3.65 | 0.040 | 0.0039 | 0.52 | 0.01 | 0.021 | 0.031 | 0.0008 | Steel |
| R | 0.112 | 0.010 | 0.0020 | 0.09 | 2.22 | 0.030 | 0.0037 | 0.67 | 0.09 | — | 0.021 | 0.0009 | Steel |
| <u>S</u> | 0.115 | <u>0.050</u> | 0.0040 | 0.08 | 2.76 | 0.044 | 0.0037 | 0.72 | 0.11 | 0.013 | 0.015 | 0.0016 | Comparative Steel |
| <u>T</u> | 0.118 | 0.014 | <u>0.0100</u> | 0.11 | 3.30 | 0.041 | 0.0042 | 0.90 | 0.01 | 0.016 | 0.021 | 0.0014 | Comparative Steel |
| U | 0.101 | 0.012 | 0.0008 | 0.3 | 3.35 | 0.030 | 0.0034 | — | — | — | — | — | Steel |
| V | 0.109 | 0.011 | 0.0009 | 0.24 | 3.18 | 0.038 | 0.0029 | — | — | — | — | — | Steel |
| W | 0.113 | 0.009 | 0.0013 | 0.25 | 2.74 | 0.032 | 0.0035 | 0.51 | — | — | — | — | Steel |
| X | 0.089 | 0.016 | 0.0018 | 0.18 | 2.88 | 0.031 | 0.0033 | — | 0.14 | — | — | — | Steel |
| Y | 0.093 | 0.017 | 0.0020 | 0.11 | 2.62 | 0.040 | 0.0028 | — | — | — | — | 0.0015 | Steel |
| Z | 0.074 | 0.013 | 0.0024 | 0.08 | 2.54 | 0.025 | 0.0037 | 0.78 | 0.28 | — | — | 0.0010 | Steel |
| ZA | 0.098 | 0.008 | 0.0019 | 0.14 | 3.02 | 0.028 | 0.0026 | — | — | 0.071 | — | 0.0003 | Steel |
| ZB | 0.118 | 0.010 | 0.0020 | 0.27 | 2.94 | 0.034 | 0.0041 | — | — | — | 0.074 | — | Steel |
| ZC | 0.105 | 0.014 | 0.0027 | 0.22 | 2.74 | 0.027 | 0.0039 | — | — | 0.072 | 0.065 | 0.0003 | Steel |
| ZD | 0.103 | 0.015 | 0.0016 | 0.13 | 2.42 | 0.036 | 0.0034 | 0.84 | — | 0.042 | 0.036 | — | Steel |
| ZE | 0.092 | 0.011 | 0.0010 | 0.23 | 3.14 | 0.030 | 0.0029 | — | — | 0.049 | — | — | Steel |

TABLE 2-1

| No. | Steel Symbol | Slab Heating Temperature (° C.) | Finishing Rolling Temperature (° C.) | Average Cooling Rate From Finishing Temperature (° C./sec) | Coiling Temperature (° C.) | Primary Average Heating Rate (° C./sec.) | Intermediate Temperature (° C.) | Excess Air Ratio During Primary Heating | Secondary Average Heating Rate (° C./sec.) |
|---|---|---|---|---|---|---|---|---|---|
| 1 | A | 1280 | 900 | 25 | 620 | 15 | 650 | 1.15 | 0.5 |
| 2 | B | 1270 | 890 | 50 | 530 | 20 | 670 | 1.12 | 0.4 |
| 3 | B | 1270 | 890 | 50 | 530 | 20 | 670 | 1.08 | 0.4 |
| 4 | B | 1270 | 890 | 50 | 530 | 20 | 670 | 1.25 | 0.4 |
| 5 | C | 1250 | 880 | 75 | 510 | 25 | 670 | 1.18 | 0.3 |
| 6 | D | 1210 | 870 | 95 | 570 | 35 | 750 | 1.18 | 0.1 |
| 7 | E | 1170 | 910 | 135 | 530 | 10 | 650 | 1.13 | 0.5 |
| 8 | F | 1250 | 930 | 120 | 510 | 25 | 600 | 1.15 | 0.7 |
| 9 | G | 1250 | 890 | 75 | 500 | 20 | 700 | 1.15 | 5.5 |
| 10 | G | 1250 | 890 | 75 | 500 | 20 | 700 | 1.05 | 5.5 |
| 11 | G | 1250 | 890 | 75 | 500 | 20 | 700 | 1.22 | 5.5 |
| 12 | H | 1180 | 870 | 85 | 560 | 35 | 640 | 1.17 | 3.5 |
| 13 | I | 1230 | 910 | 20 | 420 | 5 | 700 | 1.18 | 1.4 |
| 14 | J | 1200 | 920 | 30 | 530 | 30 | 520 | 1.11 | 3.2 |
| 15 | K | 1180 | 900 | 60 | 460 | 25 | 750 | 1.10 | 0.6 |
| 16 | L | 1160 | 920 | 70 | 550 | 15 | 600 | 1.17 | 0.9 |
| 17 | M | 1200 | 930 | 40 | 490 | 12 | 660 | 1.16 | 1.2 |
| 18 | G | 1350 | 900 | 95 | 570 | 25 | 710 | 1.15 | 2.4 |
| 19 | G | 1200 | 910 | 3 | 600 | 15 | 700 | 1.15 | 1.5 |
| 20 | G | 1200 | 910 | 50 | 700 | 15 | 700 | 1.14 | 1.5 |
| 21 | G | 1210 | 920 | 80 | 600 | 3 | 790 | 1.16 | 0.1 |
| 22 | G | 1200 | 910 | 50 | 550 | 20 | 820 | 1.13 | 1.5 |
| 23 | G | 1180 | 900 | 95 | 590 | 20 | 800 | 1.11 | 15.0 |
| 24 | G | 1170 | 900 | 85 | 570 | 15 | 780 | 1.18 | 0.5 |
| 25 | G | 1280 | 900 | 80 | 550 | 20 | 740 | 1.19 | 1.5 |
| 26 | G | 1250 | 880 | 95 | 530 | 35 | 700 | 1.15 | 2.5 |
| 27 | G | 1280 | 890 | 85 | 510 | 20 | 720 | 1.12 | 3.5 |
| 28 | N | 1230 | 900 | 110 | 560 | 35 | 740 | 1.15 | 0.6 |
| 29 | O | 1210 | 910 | 90 | 550 | 25 | 720 | 1.11 | 0.9 |
| 30 | P | 1180 | 930 | 85 | 530 | 15 | 700 | 1.14 | 1.6 |

| No. | Annealing Temp. (° C.) | Retention Time (sec) | Average Cooling Rate (° C./sec.) | Cooling Stop Temp. (° C.) | Alloying Status | Skin-pass (%) | Remarks |
|---|---|---|---|---|---|---|---|
| 1 | 825 | 25 | 5 | 515 | Alloyed | 0.3 | Example |
| 2 | 820 | 35 | 7 | 525 | Alloyed | 0.3 | Example |
| 3 | 820 | 35 | 7 | 525 | Alloyed | 0.3 | Comparative Example |
| 4 | 820 | 35 | 7 | 525 | Alloyed | 0.3 | Comparative Example |
| 5 | 820 | 45 | 9 | 510 | Alloyed | 0.3 | Example |
| 6 | 825 | 200 | 25 | 495 | Alloyed | 0.3 | Example |
| 7 | 835 | 45 | 30 | 505 | Alloyed | 0.3 | Example |
| 8 | 820 | 40 | 20 | 515 | Alloyed | 0.3 | Example |
| 9 | 830 | 50 | 10 | 480 | Alloyed | 0.3 | Example |
| 10 | 830 | 50 | 10 | 480 | Alloyed | 0.3 | Comparative Example |
| 11 | 830 | 50 | 10 | 480 | Alloyed | 0.3 | Comparative Example |
| 12 | 815 | 110 | 20 | 495 | Alloyed | 0.3 | Example |
| 13 | 850 | 50 | 15 | 500 | Non-Alloyed | 0.3 | Example |
| 14 | 770 | 150 | 10 | 520 | Alloyed | 0.3 | Example |
| 15 | 860 | 90 | 20 | 495 | Alloyed | 0.3 | Example |
| 16 | 780 | 180 | 8 | 510 | Alloyed | 0.3 | Example |
| 17 | 800 | 100 | 10 | 460 | Non-Alloyed | 0.3 | Example |
| 18 | 830 | 85 | 7 | 500 | Alloyed | 0.3 | Comparative Example |
| 19 | 800 | 90 | 10 | 490 | Alloyed | 0.3 | Comparative Example |
| 20 | 800 | 90 | 15 | 500 | Alloyed | 0.3 | Comparative Example |
| 21 | 830 | 65 | 20 | 485 | Alloyed | 0.3 | Comparative Example |
| 22 | 880 | 120 | 10 | 510 | Alloyed | 0.3 | Comparative Example |

TABLE 2-1-continued

| | | | | | | | |
|---|---|---|---|---|---|---|---|
| 23 | 835 | 45 | 15 | 495 | Alloyed | 0.3 | Comparative Example |
| 24 | 950 | 55 | 12 | 505 | Alloyed | 0.3 | Comparative Example |
| 25 | 830 | 600 | 10 | 515 | Alloyed | 0.3 | Comparative Example |
| 26 | 825 | 45 | 0.3 | 495 | Alloyed | 0.3 | Comparative Example |
| 27 | 830 | 35 | 8 | 570 | Alloyed | 0.3 | Comparative Example |
| 28 | 830 | 35 | 15 | 520 | Alloyed | 0.3 | Comparative Example |
| 29 | 825 | 45 | 20 | 495 | Alloyed | 0.3 | Example |
| 30 | 835 | 55 | 15 | 505 | Alloyed | 0.3 | Example |

TABLE 2-2

| No. | Steel Symbol | Slab Heating Temperature (°C.) | Finishing Rolling Temperature (°C.) | Average Cooling Rate From Finishing Temperature (°C./sec) | Coiling Temperature (°C.) | Primary Average Temp. Rise Rate (°C./sec) | Intermediate Temperature (°C.) | Excess Ai Ratio During Primary Heating | Secondary Average Heating Rate (°C./sec.) |
|---|---|---|---|---|---|---|---|---|---|
| 31 | Q | 1170 | 920 | 75 | 560 | 20 | 680 | 1.13 | 2.6 |
| 32 | R | 1220 | 900 | 55 | 510 | 20 | 620 | 1.12 | 0.8 |
| 33 | S | 1250 | 900 | 30 | 570 | 15 | 560 | 1.11 | 1.8 |
| 34 | T | 1200 | 900 | 45 | 420 | 5 | 640 | 1.18 | 3.8 |
| 35 | U | 1170 | 910 | 30 | 620 | 20 | 600 | 1.12 | 0.8 |
| 36 | V | 1230 | 900 | 50 | 630 | 30 | 650 | 1.14 | 1.9 |
| 37 | W | 1150 | 890 | 70 | 600 | 15 | 620 | 1.16 | 3.1 |
| 38 | X | 1200 | 880 | 100 | 540 | 10 | 700 | 1.13 | 2.6 |
| 39 | Y | 1180 | 900 | 60 | 500 | 35 | 630 | 1.12 | 2.7 |
| 40 | Z | 1200 | 940 | 50 | 520 | 25 | 540 | 1.18 | 1.5 |
| 41 | ZA | 1290 | 930 | 80 | 550 | 15 | 570 | 1.17 | 1.3 |
| 42 | ZB | 1230 | 940 | 60 | 600 | 45 | 600 | 1.11 | 0.6 |
| 43 | ZC | 1270 | 920 | 70 | 620 | 20 | 580 | 1.13 | 1.1 |
| 44 | ZD | 1250 | 930 | 30 | 580 | 15 | 630 | 1.15 | 0.7 |
| 45 | ZE | 1240 | 910 | 40 | 610 | 12 | 650 | 1.14 | 0.9 |

| No. | Annealing Temp. (°C.) | Retention Time (sec) | Average Cooling Rate (°C./sec) | Cooling Stop Temp. (°C.) | Alloying Status | Skin-pass (%) | Remarks |
|---|---|---|---|---|---|---|---|
| 31 | 830 | 65 | 20 | 515 | Alloyed | 0.3 | Example |
| 32 | 860 | 80 | 12 | 505 | Alloyed | 0.3 | Example |
| 33 | 830 | 40 | 12 | 485 | Alloyed | 0.3 | Comparative Example |
| 34 | 820 | 60 | 25 | 470 | Alloyed | 0.3 | Comparative Example |
| 35 | 780 | 60 | 10 | 480 | Alloyed | 0.3 | Example |
| 36 | 820 | 80 | 7 | 500 | Alloyed | 0.3 | Example |
| 37 | 880 | 90 | 5 | 510 | Alloyed | 0.3 | Example |
| 38 | 800 | 100 | 15 | 460 | Alloyed | 0.3 | Example |
| 39 | 760 | 120 | 20 | 530 | Alloyed | 0.3 | Example |
| 40 | 825 | 80 | 18 | 470 | Alloyed | 0.3 | Example |
| 41 | 850 | 30 | 20 | 500 | Alloyed | 0.3 | Example |
| 42 | 840 | 60 | 30 | 490 | Alloyed | 0.3 | Example |
| 43 | 800 | 20 | 14 | 520 | Alloyed | 0.3 | Example |
| 44 | 830 | 50 | 10 | 515 | Non-Alloyed | 0.3 | Example |
| 45 | 820 | 180 | 15 | 480 | Alloyed | 0.3 | Example |

TABLE 3-1

| No | Steel Symbol | Volume Fraction Of Ferrite in Steel Sheet Surface Layer (to 10 μm depth) Volume Fraction (%) | Steel Sheet Structure from 10 to 50 μm depth measured from Steel Sheet Surface | | | | | Steel Sheet Structure at a ¼ Sheet Thickness position | | | | | Remarks |
|---|---|---|---|---|---|---|---|---|---|---|---|---|---|
| | | | Ferrite Phase | | Bainite Phase and/or Martensitic Phase | | Remaining Structure* Volume Fraction (%) | Remaining Structure* | | Bainite Phase and/or Martensitic Phase | | Remaining Structure* Volume Fraction (%) | |
| | | | Average Grain Size (μm) | Volume Fraction (%) | Average Grain Size (μm) | Volume Fraction (%) | | Average Grain Size (μm) | Volume Fraction (%) | Average Grain Size (μm) | Volume Fraction (%) | | |
| 1 | A | 95 | 3.2 | 48 | 1.9 | 51 | 1 | 2.9 | 42 | 1.9 | 56 | 2 | Example |
| 2 | B | 82 | 3.0 | 47 | 2.1 | 53 | 0 | 2.8 | 43 | 2.2 | 56 | 1 | Example |
| 3 | B | <u>64</u> | 3.2 | 49 | 2.0 | 51 | 0 | 2.8 | 43 | 2.2 | 56 | 1 | Comparative Example |
| 4 | B | 99 | <u>5.4</u> | <u>72</u> | 2.1 | <u>28</u> | 0 | 2.8 | 43 | 2.2 | 56 | 1 | Comparative Example |
| 5 | C | 95 | 2.1 | 41 | 2.7 | 56 | 3 | 1.8 | 37 | 2.6 | 59 | 4 | Example |
| 6 | D | 96 | 2.1 | 46 | 2.8 | 51 | 3 | 1.7 | 43 | 2.7 | 55 | 2 | Example |
| 7 | E | 84 | 1.8 | 46 | 3.1 | 53 | 1 | 1.6 | 42 | 2.9 | 58 | 0 | Example |
| 8 | F | 90 | 2.0 | 50 | 1.9 | 48 | 2 | 2.1 | 46 | 2.0 | 54 | 0 | Example |
| 9 | G | 97 | 3.2 | 47 | 2.4 | 52 | 1 | 2.8 | 43 | 2.5 | 55 | 2 | Example |
| 10 | G | <u>57</u> | 3.2 | 47 | 2.4 | 52 | 1 | 2.8 | 43 | 2.5 | 55 | 2 | Comparative Example |
| 11 | G | 99 | <u>5.2</u> | <u>76</u> | 2.5 | 24 | 0 | 2.8 | 43 | 2.5 | 55 | 2 | Comparative Example |
| 12 | H | 87 | 3.6 | 46 | 2.7 | 54 | 0 | 3.4 | 45 | 2.7 | 55 | 0 | Example |
| 13 | I | 83 | 4.3 | 35 | 3.8 | 63 | 2 | 4.0 | 31 | 3.7 | 65 | 4 | Example |
| 14 | J | 79 | 3.8 | 51 | 3.0 | 47 | 2 | 3.5 | 48 | 3.1 | 51 | 1 | Example |
| 15 | K | 76 | 3.2 | 42 | 2.6 | 57 | 1 | 2.9 | 40 | 2.6 | 60 | 0 | Example |
| 16 | L | 94 | 2.1 | 55 | 1.9 | 44 | 1 | 1.8 | 53 | 1.9 | 46 | 1 | Example |
| 17 | M | 90 | 2.4 | 48 | 2.8 | 48 | 4 | 2.2 | 45 | 2.6 | 53 | 2 | Example |
| 18 | G | 85 | <u>8.2</u> | 47 | <u>10.9</u> | 50 | 3 | <u>7.8</u> | 43 | <u>10.6</u> | 55 | 2 | Comparative Example |
| 19 | G | 86 | <u>8.8</u> | 49 | <u>7.9</u> | 51 | 0 | <u>8.6</u> | 45 | <u>7.8</u> | 54 | 1 | Comparative Example |
| 20 | G | 82 | <u>7.1</u> | 49 | <u>6.3</u> | 50 | 1 | <u>6.8</u> | 46 | <u>6.4</u> | 52 | 2 | Comparative Example |
| 21 | G | 88 | <u>6.1</u> | 46 | <u>7.0</u> | 54 | 0 | <u>5.9</u> | 43 | <u>6.9</u> | 56 | 1 | Comparative Example |
| 22 | G | 81 | <u>5.9</u> | 41 | <u>8.4</u> | 56 | 3 | <u>5.8</u> | 38 | <u>8.3</u> | 61 | 1 | Comparative Example |
| 23 | G | 80 | 1.9 | <u>78</u> | 3.9 | <u>20</u> | 2 | 1.6 | <u>76</u> | 4.0 | <u>26</u> | 0 | Comparative Example |

*Residual Austenite Phase and/or Pearlite Phase

TABLE 3-2

| No | Steel Symbol | Volume Fraction of Ferrite in Steel Sheet Surface Layer to 10 μm Volume Fraction (%) | Steel Sheet Structure to the depth of 10 to 50 μm from Steel Sheet Surface | | | | | Steel Sheet Structure at a position of ¼ Sheet Thickness | | | | | Remarks |
|---|---|---|---|---|---|---|---|---|---|---|---|---|---|
| | | | Ferrite Phase | | Bainite Phase and/or Martensitic Phase | | Remaining Structure* Volume Fraction (%) | Remaining Structure* | | Bainite Phase and/or Martensitic Phase | | Remaining Structure* Volume Fraction (%) | |
| | | | Average Grain Size (μm) | Volume Fraction (%) | Average Grain Size (μm) | Volume Fraction (%) | | Average Grain Size (μm) | Volume Fraction (%) | Average Grain Size (μm) | Volume Fraction (%) | | |
| 24 | G | 92 | <u>7.7</u> | 33 | <u>10.8</u> | 67 | 0 | <u>7.5</u> | 28 | <u>10.8</u> | 72 | 0 | Comparative Example |
| 25 | G | 94 | <u>6.9</u> | 46 | <u>7.1</u> | 51 | 3 | <u>6.8</u> | 43 | <u>7.2</u> | 53 | 4 | Comparative Example |
| 26 | G | 92 | 3.2 | <u>75</u> | 3.5 | <u>16</u> | <u>9</u> | 2.9 | <u>72</u> | 3.5 | <u>18</u> | <u>10</u> | Comparative Example |
| 27 | G | 88 | 3.0 | 47 | 4.3 | 42 | <u>11</u> | 2.7 | 45 | 4.2 | 43 | <u>12</u> | Comparative Example |
| 28 | <u>N</u> | 86 | 1.9 | 46 | 2.5 | 53 | 1 | 1.7 | 44 | 2.4 | 56 | 1 | Comparative Example |
| 29 | O | 77 | 3.1 | 44 | 2.4 | 56 | 0 | 2.9 | 41 | 2.3 | 58 | 0 | Example |
| 30 | P | 90 | 2.9 | 47 | 4.8 | 51 | 2 | 2.6 | 43 | 4.8 | 57 | 3 | Example |
| 31 | Q | 94 | 2.4 | 40 | 4.7 | 57 | 3 | 2.2 | 37 | 4.7 | 60 | 2 | Example |

TABLE 3-2-continued

| | | Volume Fraction of Ferrite in Steel Sheet Surface Layer to 10 μm Volume Fraction (%) | Steel Sheet Structure to the depth of 10 to 50 μm from Steel Sheet Surface | | | | | Steel Sheet Structure at a position of ¼ Sheet Thickness | | | | | |
|---|---|---|---|---|---|---|---|---|---|---|---|---|---|
| | | | Ferrite Phase | | Bainite Phase and/or Martensitic Phase | | Remaining Structure* Volume Fraction (%) | Remaining Structure* | | Bainite Phase and/or Martensitic Phase | | Remaining Structure* Volume Fraction (%) | |
| No | Steel Symbol | | Average Grain Size (μm) | Volume Fraction (%) | Average Grain Size (μm) | Volume Fraction (%) | | Average Grain Size (μm) | Volume Fraction (%) | Average Grain Size (μm) | Volume Fraction (%) | | Remarks |
| 32 | R | 86 | 4.9 | 44 | 4.5 | 55 | 1 | 4.7 | 42 | 4.5 | 58 | 0 | Example |
| 33 | S | 79 | 4.5 | 48 | 4.4 | 52 | 0 | 4.3 | 44 | 4.6 | 54 | 2 | Comparative Example |
| 34 | T | 90 | 3.4 | 38 | 3.6 | 60 | 2 | 3.2 | 35 | 3.8 | 62 | 3 | Comparative Example |
| 35 | U | 75 | 3.9 | 55 | 3.3 | 43 | 2 | 3.5 | 53 | 3.2 | 46 | 1 | Example |
| 36 | V | 82 | 4.2 | 57 | 3.8 | 42 | 1 | 4.0 | 55 | 3.5 | 43 | 2 | Example |
| 37 | W | 88 | 4.8 | 46 | 4.0 | 51 | 3 | 4.4 | 42 | 3.8 | 55 | 3 | Example |
| 38 | X | 94 | 4.0 | 53 | 4.1 | 46 | 1 | 3.6 | 51 | 3.9 | 48 | 1 | Example |
| 39 | Y | 77 | 3.7 | 60 | 3.6 | 40 | 0 | 4.0 | 57 | 3.5 | 43 | 0 | Example |
| 40 | Z | 82 | 4.2 | 60 | 4.0 | 40 | 0 | 3.9 | 58 | 3.9 | 41 | 1 | Example |
| 41 | ZA | 79 | 3.3 | 54 | 3.3 | 43 | 3 | 3.0 | 52 | 3.0 | 46 | 2 | Example |
| 42 | ZB | 76 | 3.4 | 48 | 3.3 | 50 | 2 | 3.2 | 44 | 3.1 | 54 | 2 | Example |
| 43 | ZC | 85 | 3.2 | 49 | 3.1 | 48 | 3 | 3.2 | 48 | 3.0 | 50 | 2 | Example |
| 44 | ZD | 87 | 3.1 | 52 | 3.1 | 46 | 2 | 3.0 | 50 | 3.1 | 49 | 1 | Example |
| 45 | ZE | 81 | 3.3 | 62 | 3.2 | 38 | 0 | 3.2 | 61 | 3.2 | 38 | 1 | Example |

*Residual Austenite Phase and/or Pearlite Phase

TABLE 4

| | | Material Properties | | | | | | |
|---|---|---|---|---|---|---|---|---|
| No | Steel Symbol | YP/ MPa | TS/ MPa | El/ % | Limit Bending Radius/Sheet Thickness | Resistance Spot Weldability | Durability Ratio | Remarks |
| 1 | A | 703 | 1008 | 15.1 | 0.13 | Base Material Fracture | 0.40 | Example |
| 2 | B | 717 | 1035 | 14.6 | 0.25 | Base Material Fracture | 0.41 | Example |
| 3 | B | 714 | 1032 | 14.7 | 0.75 | Base Material Fracture | 0.41 | Comparative Example |
| 4 | B | 658 | 1016 | 15.1 | 0.13 | Base Material Fracture | 0.32 | Comparative Example |
| 5 | C | 731 | 1052 | 13.4 | 0.13 | Base Material Fracture | 0.40 | Example |
| 6 | D | 700 | 1030 | 14.6 | 0.13 | Base Material Fracture | 0.41 | Example |
| 7 | E | 703 | 1004 | 15.0 | 0.25 | Base Material Fracture | 0.40 | Example |
| 8 | F | 742 | 1060 | 14.3 | 0.13 | Base Material Fracture | 0.39 | Example |
| 9 | G | 685 | 1022 | 14.7 | 0.13 | Base Material Fracture | 0.41 | Example |
| 10 | G | 695 | 1026 | 14.8 | 0.50 | Base Material Fracture | 0.41 | Comparative Example |
| 11 | G | 624 | 994 | 15.1 | 0.13 | Base Material Fracture | 0.31 | Comparative Example |
| 12 | H | 720 | 1044 | 13.9 | 0.25 | Base Material Fracture | 0.36 | Example |
| 13 | I | 732 | 1061 | 16.3 | 0.13 | Base Material Fracture | 0.37 | Example |
| 14 | J | 704 | 1009 | 16.7 | 0.25 | Base Material Fracture | 0.41 | Example |
| 15 | K | 711 | 1030 | 15.0 | 0.25 | Base Material Fracture | 0.38 | Example |
| 16 | L | 738 | 1025 | 14.7 | 0.13 | Base Material Fracture | 0.41 | Example |
| 17 | M | 674 | 1048 | 16.2 | 0.25 | Base Material Fracture | 0.39 | Example |
| 18 | G | 715 | 1022 | 14.7 | 0.75 | Base Material Fracture | 0.35 | Comparative Example |
| 19 | G | 692 | 1013 | 13.4 | 0.75 | Base Material Fracture | 0.36 | Comparative Example |
| 20 | G | 683 | 1002 | 14.0 | 0.75 | Base Material Fracture | 0.38 | Comparative Example |
| 21 | G | 686 | 1024 | 14.7 | 0.50 | Base Material Fracture | 0.37 | Comparative Example |
| 22 | G | 765 | 1084 | 11.3 | 1.00 | Base Material Fracture | 0.38 | Comparative Example |
| 23 | G | 556 | 814 | 19.5 | 0.13 | Base Material Fracture | 0.40 | Comparative Example |
| 24 | G | 819 | 1170 | 10.1 | 0.75 | Base Material Fracture | 0.35 | Comparative Example |
| 25 | G | 711 | 1015 | 14.8 | 0.50 | Base Material Fracture | 0.36 | Comparative Example |
| 26 | G | 540 | 771 | 19.2 | 0.13 | Base Material Fracture | 0.35 | Comparative Example |
| 27 | G | 715 | 905 | 17.8 | 0.13 | Base Material Fracture | 0.35 | Comparative Example |
| 28 | N | 784 | 1120 | 11.2 | 0.13 | Fracture in Nugget | 0.41 | Comparative Example |
| 29 | O | 682 | 995 | 10.1 | 0.30 | Base Material Fracture | 0.40 | Example |
| 30 | P | 722 | 1032 | 14.6 | 0.30 | Base Material Fracture | 0.39 | Example |
| 31 | Q | 759 | 1084 | 11.8 | 0.30 | Base Material Fracture | 0.39 | Example |
| 32 | R | 625 | 991 | 16.1 | 0.30 | Base Material Fracture | 0.38 | Example |
| 33 | S | 605 | 1014 | 16.5 | 0.25 | Fracture in Nugget | 0.39 | Comparative Example |
| 34 | T | 764 | 1082 | 14.1 | 0.25 | Fracture in Nugget | 0.40 | Comparative Example |
| 35 | U | 683 | 1046 | 16.1 | 0.30 | Base Material Fracture | 0.36 | Example |
| 36 | V | 716 | 1024 | 14.8 | 0.30 | Base Material Fracture | 0.35 | Example |
| 37 | W | 843 | 1094 | 10.5 | 0.30 | Base Material Fracture | 0.35 | Example |
| 38 | X | 643 | 1001 | 16.8 | 0.30 | Base Material Fracture | 0.36 | Example |

TABLE 4-continued

| | | | | | Limit Bending | | | |
| No | Steel Symbol | YP/ MPa | TS/ MPa | El/ % | Radius/Sheet Thickness | Resistance Spot Weldability | Durability Ratio | Remarks |
|---|---|---|---|---|---|---|---|---|
| 39 | Y | 635 | 983 | 17.0 | 0.30 | Base Material Fracture | 0.37 | Example |
| 40 | Z | 608 | 989 | 17.2 | 0.30 | Base Material Fracture | 0.38 | Example |
| 41 | ZA | 712 | 1036 | 15.1 | 0.30 | Base Material Fracture | 0.38 | Example |
| 42 | ZB | 746 | 1088 | 13.4 | 0.30 | Base Material Fracture | 0.39 | Example |
| 43 | ZC | 772 | 1062 | 12.1 | 0.30 | Base Material Fracture | 0.38 | Example |
| 44 | ZD | 693 | 1041 | 14.2 | 0.30 | Base Material Fracture | 0.39 | Example |
| 45 | ZE | 706 | 999 | 16.5 | 0.30 | Base Material Fracture | 0.38 | Example |

As shown in Table 4, our high strength galvanized steel sheets exhibit excellent bendability (the limit bending radius ≤0.3t) and excellent resistance spot weldability, while simultaneously satisfying good plane bending fatigue properties (durability ratio ≥0.35). Further, it is understood that the Examples with the steel symbols A to M each satisfying a particularly preferable composition reliably exhibit more excellent bendability (the limit bending radius ≤0.25t).

In contrast, the steel samples of No. 28, 33, and 34, each having a steel element composition beyond our range, exhibit relatively poor weldability, respectively.

The steel samples of No. 3, 4, 10, and 11, each having an excess air ratio during the primary heating beyond our range, exhibit relatively poor bendability or plane-bending fatigue properties (durability ratio), respectively.

The steel samples of No. 18, 21, and 25, in each of which at least one of the conditions of the slab heating temperature, the primary heating rate, and the retention time is beyond our range(s), exhibit relatively poor bendability, respectively, because the crystal grain size of the ferrite phase is coarse.

The steel sample of No. 19, having the average cooling rate from the finishing temperature beyond our range, exhibits relatively poor bendability because the crystal grain size of the ferrite phase is coarse.

The steel samples of No. 20 and 22, each having the coiling temperature and the intermediate temperature beyond our ranges, exhibit relatively poor bendability, respectively, because the crystal grain size of the ferrite phase is coarse.

The steel samples of No. 23 and 26, each having the secondary heating rate or the cooling rate to the cooling stop temperature beyond our range, exhibit a relatively large volume fraction of the ferrite phase and thus a TS value lower than 980 MPa, respectively.

The steel sample of No. 24, having the annealing temperature beyond our range, exhibits relatively poor bendability because the crystal grain size of the ferrite phase is coarse.

The steel sample of No. 27 having the cooling stop temperature beyond our range exhibits TS lower than 980 MPa.

INDUSTRIAL APPLICABILITY

Our high strength galvanized steel sheets have excellent bendability and weldability, as well as a high tensile strength, and therefore can be suitably used, to cause a good effect, for applications requiring strict dimensional accuracy and bendability such as automobile components, architecture and household appliances.

The invention claimed is:

1. A method of manufacturing a galvanized steel sheet comprising:
    subjecting a steel slab having a composition comprising by mass %:
        C: equal to or more than 0.05% and less than 0.12%;
        P: 0.001 to 0.040%;
        S: equal to or less than 0.0050%;
        Si: 0.01 to 1.6%;
        Mn: 2.0 to 3.5 %;
        Al: 0.005 to 0.1%;
        N: equal to or less than 0.0060%; and
        the remainder as Fe and incidental impurities, to heating at a temperature of 1150° C. to 1300° C. and then hot rolling the slab at a finisher delivery temperature of 850 to 950° C. to form a steel sheet;
    cooling the steel sheet from the finisher delivery temperature to (the finisher delivery temperature minus 100° C.) at an average cooling rate of 5 to 200° C./second;
    winding up the steel sheet into a coil at a temperature of 400 to 650° C.;
    subjecting the steel sheet to pickling and cold rolling; and
    subjecting the steel sheet to annealing including a two-stage temperature raising process, wherein the annealing step includes:
    primary heating the steel sheet from 200° C. to an intermediate temperature of 500 to 800° C. at a primary average heating rate of 5 to 50° C/second at an excess air ratio of 1.10 to 1.20 maintained up to the intermediate temperature;
    secondary heating the steel sheet from the intermediate temperature to an annealing temperature of 800 to 900° C. at a secondary average heating rate of 0.1 to 10° C./second at an excess air ratio of less than 1.10 maintained up to the annealing temperature;
    holding the steel sheet in a range of the annealing temperature for 10 to 500 seconds;
    cooling the steel sheet to a temperature of 450 to 550° C. at an average cooling rate of 1 to 30° C./second; and
    subjecting the steel sheet to a galvanizing process and, optionally, an alloying process
    wherein a steel sheet surface layer, constituting a portion of the steel sheet up to a depth of 10 μm measured from each surface of the steel sheet, has a structure containing more than 70% and equal to or less than 88% of ferrite phase by a volume fraction,
    a steel sheet inner layer portion, on an inner side than the depth of 10 μm measured from each surface, has a structure containing 20 to 70% by a volume fraction of ferrite phase with an average crystal grain size equal to or smaller than 5 μm, 30 to 80% of bainite phase and/or martensitic phase by a volume fraction, with an average crystal grain size of equal to or smaller than 5 μm, and residual austenite phase and/or pearlite phase equal to or less than 5% (inclusive of 0%) by a volume fraction as the remainder, the steel sheet has 1) a tensile strength equal to or larger than 980 MPa, 2) a galvanized layer on a surface thereof, 3) a durability ratio, defined as fatigue limit/tensile strength, of 0.35 or larger, and 4) a limit bending radius equal to or smaller than 0.3 t (t is a sheet thickness of the steel sheet).

2. A method of manufacturing a galvanized steel sheet, comprising:

subjecting a steel slab having a composition comprising by mass%:
C: equal to or more than 0.05% and less than 0.12%;
P: 0.001 to 0.040%;
S: equal to or less than 0.0050%;
Si: 0.01 to 1.6%;
Mn: 2.0 to 3.5%;
Al: 0.005 to 0.1%;
N: equal to or less than 0.0060%; and
at least one element selected from the group consisting of Cr: more than 0.5% and equal to or less than 2.0%, Mo: 0.01% to 0.50%, and B: 0.0001% to 0.0030%,
the remainder as Fe and incidental impurities, to heating at a temperature of 1150° C. to 1300° C. and then hot rolling the slab at a finisher delivery temperature of 850 to 950° C. to form a steel sheet;
cooling the steel sheet from the finisher delivery temperature to (the finisher delivery temperature minus 100° C.) at an average cooling rate of 5 to 200° C./second;
winding up the steel sheet into a coil at a temperature of 400 to 650° C.;
subjecting the steel sheet to pickling and cold rolling; and
subjecting the steel sheet to annealing including a two-stage temperature raising process,
wherein the annealing step includes:
primary heating the steel sheet from 200° C. to an intermediate temperature of 500 to 800° C. at a primary average heating rate of 5 to 50° C./second at an excess air ratio of 1.10 to 1.20 maintained up to the intermediate temperature;
secondary heating the steel sheet from the intermediate temperature to an annealing temperature of 800 to 900° C. at a secondary average heating rate of 0.1 to 10° C./second at an excess air ratio of less than 1.10 maintained up to the annealing temperature;
holding the steel sheet in a range of the annealing temperature for 10 to 500 seconds;
cooling the steel sheet to a temperature of 450 to 550° C. at an average cooling rate of 1 to 30° C./second; and
subjecting the steel sheet to a galvanizing process and, optionally, an alloying process
wherein a steel sheet surface layer, constituting a portion of the steel sheet up to a depth of 10 μm measured from each surface of the steel sheet, has a structure containing more than 70% and equal to or less than 88% of ferrite phase by a volume fraction,
a steel sheet inner layer portion, on an inner side than the depth of 10 μm measured from each surface, has a structure containing 20 to 70% by a volume fraction of ferrite phase with an average crystal grain size equal to or smaller than 5 μm, 30 to 80% of bainite phase and/or martensitic phase by a volume fraction, with an average crystal grain size of equal to or smaller than 5 μm, and residual austenite phase and/or pearlite phase equal to or less than 5% (inclusive of 0%) by a volume fraction as the remainder, the steel sheet has 1) a tensile strength equal to or larger than 980 MPa, 2) a galvanized layer on a surface thereof, 3) a durability ratio, defined as fatigue limit/tensile strength, of 0.35 or larger, and 4) a limit bending radius equal to or smaller than 0.3 t (t is a sheet thickness of the steel sheet).

3. A method of manufacturing a galvanized steel sheet, comprising:

subjecting a steel slab having a composition comprising by mass%:
C: equal to or more than 0.05% and less than 0.12%;
P: 0.001 to 0.040%;
S: equal to or less than 0.0050%;
Si: 0.01 to 1.6%;
Mn: 2.0 to 3.5%;
Al: 0.005 to 0.1%;
N: equal to or less than 0.0060%; and
at least one element selected from the group consisting of Ti: 0.010% to 0.080%
and Nb: 0.010 to 0.080%,
the remainder as Fe and incidental impurities, to heating at a temperature of 1150° C. to 1300° C. and then hot rolling the slab at a finisher delivery temperature of 850 to 950° C. to form a steel sheet;
cooling the steel sheet from the finisher delivery temperature to (the finisher delivery temperature minus 100° C.) at an average cooling rate of 5 to 200° C./second;
winding up the steel sheet into a coil at a temperature of 400 to 650° C.;
subjecting the steel sheet to pickling and cold rolling; and
subjecting the steel sheet to annealing including a two-stage temperature raising process, wherein the annealing step includes:
primary heating the steel sheet from 200° C. to an intermediate temperature of 500 to 800° C. at a primary average heating rate of 5 to 50° C./second at an excess air ratio of 1.10 to 1.20 maintained up to the intermediate temperature;
secondary heating the steel sheet from the intermediate temperature to an annealing temperature of 800 to 900° C. at a secondary average heating rate of 0.1 to 10° C./second at an excess air ratio of less than 1.10 maintained up to the annealing temperature;
holding the steel sheet in a range of the annealing temperature for 10 to 500 seconds;
cooling the steel sheet to a temperature of 450 to 550 20 C. at an average cooling rate of 1 to 30° C./second; and
subjecting the steel sheet to a galvanizing process and, optionally, an alloying process
wherein a steel sheet surface layer, constituting a portion of the steel sheet up to a depth of 10 μm measured from each surface of the steel sheet, has a structure containing more than 70% and equal to or less than 88% of ferrite phase by a volume fraction,
a steel sheet inner layer portion, on an inner side than the depth of 10 μm measured from each surface, has a structure containing 20 to 70% by a volume fraction of ferrite phase with an average crystal grain size equal to or smaller than 5 μm, 30 to 80% of bainite phase and/or martensitic phase by a volume fraction, with an average crystal grain size of equal to or smaller than 5 μm, and residual austenite phase and/or pearlite phase equal to or less than 5% (inclusive of 0%) by a volume fraction as the remainder, the steel sheet has 1) a tensile strength equal to or larger than 980 MPa, 2) a galvanized layer on a surface thereof, 3) a durability ratio, defined as fatigue limit/tensile strength, of 0.35 or larger, and 4) a limit bending radius equal to or smaller than 0.3 t (t is a sheet thickness of the steel sheet).

4. A method of manufacturing a galvanized steel sheet, comprising:
subjecting a steel slab having a composition by mass%:
C: equal to or more than 0.05% and less than 0.12%;
P: 0.001 to 0.040%;
S: equal to or less than 0.0050%;
Si: 0.01 to 1.6%;
Mn: 2.0 to 3.5%;
Al: 0.005 to 0.1%;
N: equal to or less than 0.0060%;
at least one element selected from the group consisting of Cr: more than 0.5% and equal to or less than 2.0%, Mo: 0.01% to 0.50%, and B: 0.0001% to 0.0030%; and
at least one element selected from the group consisting of: Ti: 0.010% to 0.080% and Nb: 0.010% to 0.080%,
the remainder as Fe and incidental impurities, to heating at a temperature of 1150° C. to 1300° C. and then hot rolling the slab at a finisher delivery temperature of 850 to 950° C. to form a steel sheet;
cooling the steel sheet from the finisher delivery temperature to (the finisher delivery temperature minus 100° C.) at an average cooling rate of 5 to 200° C./second;
winding up the steel sheet into a coil at a temperature of 400 to 650° C.;
subjecting the steel sheet to pickling and cold rolling; and
subjecting the steel sheet to annealing including a two-stage temperature raising process, wherein the annealing step includes:
primary heating the steel sheet from 200° C. to an intermediate temperature of 500 to 800° C. at a primary average heating rate of 5 to 50° C./second at an excess air ratio of 1.10 to 1.20 maintained up to the intermediate temperature;
secondary heating the steel sheet from the intermediate temperature to an annealing temperature of 800 to 900° C. at a secondary average heating rate of 0.1 to 10° C./second at an excess air ratio of less than 1.10 maintained up to the annealing temperature;
holding the steel sheet in a range of the annealing temperature for 10 to 500 seconds;
cooling the steel sheet to a temperature of 450 to 550° C. at an average cooling rate of 1 to 30° C./second; and
subjecting the steel sheet to a galvanizing process and, optionally, an alloying process
wherein a steel sheet surface layer, constituting a portion of the steel sheet up to a depth of 10 μm measured from each surface of the steel sheet, has a structure containing more than 70% and equal to or less than 88% of ferrite phase by a volume fraction,
a steel sheet inner layer portion, on an inner side than the depth of 10 μm measured from each surface, has a structure containing 20 to 70% by a volume fraction of ferrite phase with an average crystal grain size equal to or smaller than 5 μm, 30 to 80% of bainite phase and/or martensitic phase by a volume fraction, with an average crystal grain size of equal to or smaller than 5 μm, and residual austenite phase and/or pearlite phase equal to or less than 5% (inclusive of 0%) by a volume fraction as the remainder,
the steel sheet has 1) a tensile strength equal to or larger than 980 MPa, 2) a galvanized layer on a surface thereof, 3) a durability ratio, defined as fatigue limit/tensile strength, of 0.35 or larger, and 4) a limit bending radius equal to or smaller than 0.3 t (t is a sheet thickness of the steel sheet).

* * * * *